United States Patent
Loeffler et al.

(10) Patent No.: US 10,697,909 B2
(45) Date of Patent: Jun. 30, 2020

(54) DEVICE FOR SORTING MATERIALS, IN PARTICULAR SCRAP PARTICLES, BY MEANS OF X-RAY FLUORESCENCE

(71) Applicant: Bruker AXS GmbH, Karlsruhe (DE)

(72) Inventors: Rainer Loeffler, Gernsbach (DE); Juergen Fink, Elchesheim-Illingen (DE)

(*) Notice: Subject to any disclaimer, the term of this patent is extended or adjusted under 35 U.S.C. 154(b) by 471 days.

(21) Appl. No.: 15/592,828

(22) Filed: May 11, 2017

(65) Prior Publication Data

US 2017/0328845 A1    Nov. 16, 2017

(30) Foreign Application Priority Data

May 13, 2016   (DE) .................. 10 2016 208 320

(51) Int. Cl.
  *G01N 23/223*   (2006.01)
  *G01T 1/167*   (2006.01)
  (Continued)

(52) U.S. Cl.
  CPC .......... *G01N 23/223* (2013.01); *B07C 5/346* (2013.01); *B07C 5/3416* (2013.01);
  (Continued)

(58) Field of Classification Search
  CPC ................ B07C 5/3416; B07C 5/346; B07C 2501/0036; B07C 2501/0054;
  (Continued)

(56) References Cited

U.S. PATENT DOCUMENTS 5,493,122 A   2/1996   Farr
5,574,284 A   11/1996  Farr
(Continued)

FOREIGN PATENT DOCUMENTS

DE   102010024626 A1   12/2011
DE   102011080077 A1   1/2013
(Continued)

OTHER PUBLICATIONS

Schmitt, B. et al., "Mythen detector system", Nuclear Instruments and Methods in Physics Research, A 501 (2003) pp. 267-272.
(Continued)

*Primary Examiner* — Chih-Cheng Kao
(74) *Attorney, Agent, or Firm* — Benoit & Côté Inc.

(57) ABSTRACT

A device for identifying materials on a conveyor belt by means of X-ray fluorescence comprises an X-ray source, from which X-ray radiation is guided onto material parts, a detector head containing an X-ray detector with a multiplicity of detector elements arranged in a planar fashion for receiving X-ray radiation and converting it into electrical charge signals, and an electronic unit for reading out and processing the charge signals, which comprises for each individual detector element a signal channel having a discriminator unit with a plurality of energy thresholds and a counting unit apparatus for converting the signals into digital counting events, wherein the electronic units are interconnected such that simultaneous occurrence of signals on more than one detector element can be identified and treated separately.

20 Claims, 34 Drawing Sheets

(51) Int. Cl.
 B07C 5/342 (2006.01)
 B07C 5/34 (2006.01)
 B07C 5/346 (2006.01)
(52) U.S. Cl.
 CPC ............ B07C 5/3427 (2013.01); G01T 1/167
 (2013.01); B07C 2501/0036 (2013.01); B07C
 2501/0054 (2013.01); G01N 2223/501
 (2013.01); G01N 2223/643 (2013.01)
(58) Field of Classification Search
 CPC ............ B07C 5/3427; G01N 2223/501; G01N
 2223/643; G01N 23/223
 See application file for complete search history.

(56) References Cited

U.S. PATENT DOCUMENTS

| | | | |
|---|---|---|---|
| 5,889,313 A * | 3/1999 | Parker | H01L 27/14603 250/370.09 |
| 7,138,637 B2 | 11/2006 | Miyaguchi | |
| 7,208,739 B1 | 4/2007 | Yanoff et al. | |
| 7,763,820 B1 | 7/2010 | Sommer, Jr. et al. | |
| 8,050,385 B2 | 11/2011 | Proksa | |
| 8,373,135 B2 | 2/2013 | Kappler | |
| 8,855,809 B2 | 10/2014 | Spencer et al. | |
| 9,031,197 B2 | 5/2015 | Spahn | |
| 2004/0017224 A1 * | 1/2004 | Tumer | H03F 3/087 327/51 |
| 2007/0030953 A1 | 2/2007 | Sommer et al. | |
| 2013/0079918 A1 * | 3/2013 | Spencer | B07C 5/3416 378/45 |
| 2013/0330662 A1 * | 12/2013 | Goodwin | G01J 1/42 430/30 |
| 2014/0236523 A1 | 8/2014 | Matsushita et al. | |

FOREIGN PATENT DOCUMENTS

| | | |
|---|---|---|
| DE | 102014202519 A1 | 8/2014 |
| JP | H5-113406 A | 5/1993 |
| JP | H7-318656 A | 12/1995 |
| JP | 2005-121468 A | 5/2005 |
| JP | 2007155360 A | 6/2007 |
| WO | 2011002452 A1 | 1/2011 |

OTHER PUBLICATIONS

Wiacek et al., "Position sensitive and energy dispersive x-ray detector based on silicon strip detector technology", JINST 10 P04002 (2015).

Lutz, Gerhard, "Semiconductor Radiation Detectors", ISBN 978-3-540-71678-5, 1st ed. 1999.

Schmitt B et al., "Mythen Detector System", Nuclear Intruments & Methods in Physics Research. Section A: Accelerators, Spectrometers, Detectors, and Associated Equipment, Elsevier BV., North-Holland, NL, Mar. 21, 2003.

Veale, M.C. et al., "Measurements of Charge Sharing in Small Pixel CdTe Deterctors", Nuclear Intruments & Methods in Physics Research. Section A: Accelerators, Spectrometers, Detectors, and Associated Equipment, Bd. 767, Dec. 2014.

* cited by examiner

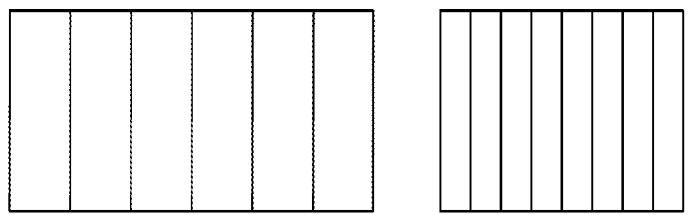

DEVICE FOR SORTING MATERIALS, IN PARTICULAR SCRAP PARTICLES, BY MEANS OF X-RAY FLUORESCENCE

BACKGROUND OF THE INVENTION

Field of the Invention

This invention relates generally to the field of X-ray fluorescence and, more particularly, to the use of X-ray fluorescence for sorting materials.

Description of the Related Art

The invention relates to a device for identifying materials, in particular metal parts such as scrap particles, on a stationary or moving conveyor belt by means of X-ray fluorescence comprising an X-ray source, from which X-ray radiation is guided onto the material parts to be examined on the conveyor belt, comprising a detector head containing an X-ray detector array having a multiplicity of detector elements arranged in a planar fashion for receiving X-ray radiation scattered at the material parts or excited by the latter and for converting said X-ray radiation into electrical charge signals, and also an electronic unit for reading out and processing the charge signals from the detector elements, which comprises for each individual detector element of the X-ray detector array a signal channel having in each case: a discriminator unit having at least two adjustable discriminator thresholds for detecting all Gaussian curve-like signals whose amplitude is greater than one of the two or simultaneously greater than both discriminator thresholds; and also one counting unit per discriminator threshold for converting the analog Gaussian curve-like signals into digital counting events. A sorting device having these features is known from U.S. Pat. No. 8,855,809 B2 (Reference [1]).

Measurements using X-ray fluorescence are powerful methods of instrumental analysis which can be used to detect and characterize metallic materials, in particular. Various measurement geometries are used depending on the analytical objective.

Normally an X-ray source irradiates material lying on a stationary or moving conveyor belt with X-ray radiation. The X-ray fluorescence radiation generated in the process is usually guided via a collimation unit and subsequently impinges on an individual X-ray radiation detector or on an X-ray detector array. Such an array may be composed of a plurality of discrete X-ray radiation detectors or is formed by a multiplicity of individual detector elements that are usually arranged on a monolithic semiconductor substrate. The simultaneous combination of discrete and monolithic detectors is also possible. Generally, such a detection system has the task of determining the chemical composition of the materials moved on a moving conveyor belt and of monitoring them, or of determining the exact spatial position of materials on the conveyor belt which have a predefined chemical composition.

Reference [1] describes a generic material sorting device on the basis of X-ray fluorescence measurements using a variety of different types of detector elements of the X-ray detector array: Reference [1] mentions X-ray detector arrays based on the sensor materials CdT (cadmium telluride) and CZT (cadmium zinc telluride) or the detector technologies SiLi (lithium-drifted silicon detectors), SDD (silicon drift detectors) and phosphor-on-silicon. In particular, the detector types Si-Pin and XR-100T-CZT from Amptek and the so-called NEXIS system from Nova R&D are mentioned.

The detection technologies mentioned in Reference [1] are distinguished by individual strengths. In this regard, by way of example, the NEXIS system has a high spatial resolution and can determine the spatial position of individual materials relatively precisely. This is achieved by virtue of the small spacing of its individual detector elements of 1 mm. In addition, this detector has a very high dynamic range. Each individual detector element can process radiation intensities of the order of magnitude of up to $10^6$ X-ray photons per second. However, the NEXIS system has a relatively poor energy resolution of several 1000 eV (FWHM) and is therefore not able to analytically separate chemical elements whose fluorescence spectra are energetically close together. Moreover, the NEXIS system in particular in conjunction with the detector materials CdT and CZT is suitable only to a very limited extent for an X-ray fluorescence analysis in the energy range of less than 20 keV.

Other detectors mentioned in Reference [1] are based on the technologies Si-Pin, SiLi and SDD and have best energy resolutions of less than 150 eV @ 5.9 keV (FWHW). They are able to precisely analyze the X-ray fluorescence spectra of different chemical elements in the energy range of from 1 keV up to normally 30 keV. However, the usable global counting rate of such an X-ray radiation detector is limited and much lower than in the NEXIS system. In practice, detector arrays based on the technologies Si-Pin, SiLi or SDD are generally composed of discrete individual detectors. In this case, each individual detector has an active area of several square millimeters. Therefore, the spatial resolution of materials that is achievable in the case of such configurations is one or more orders of magnitude worse than in the case of the NEXIS system. On the basis of these detector technologies, there are also monolithic solutions having a plurality of detector elements on a single semiconductor substrate. However, here as well the individual detector elements are at a distance of at least several millimeters from one another. Moreover, the technologies Si-Pin, SiLi and SDD require very costly cooling of the sensor to temperatures of significantly less than −10° C.

For applications that simultaneously require a high energy resolution and also a high dynamic range and a high spatial resolution, Reference [1] proposes the formation of hybrid X-ray detector arrays composed of detectors of different types of detector technologies. In particular, the patent mentions hybrid detector arrays composed of combinations based on CdT, CZT, Si(Li) and SDD detectors. However, such hybrid detector arrays solve only few of the inadequacies mentioned above for the individual detector technologies.

The following disadvantages apply to all the X-ray detection arrangements mentioned in Reference [1]:

Materials of different chemical compositions whose X-ray fluorescence radiation has been detected with a high energy resolution and whose chemical composition has been precisely identified can be localized on the conveyor belt only with a relatively large spatial uncertainty.

Materials of different chemical compositions whose position on the conveyor belt has been localized relatively precisely on the conveyor belt by a detector having good spatial resolution cannot be identified, or can be identified only with limited accuracy, with regard to their chemical composition, since the detector used for this purpose has an excessively poor energy resolution.

Since the detectors mentioned which have a high energy resolution have only a relatively limited dynamic range of the local and global counting rate, the intensity of the X-ray fluorescence radiation has to be limited to relatively low values in order to avoid saturation in the radiation detectors in the case of greatly varying material compositions. This substantive matter directly influences the achievable counting statistics and the maximum possible conveyor belt speeds.

For the energy range of 0 to 20 keV, Reference [1] does not mention any suitable detector technology having a high spatial resolution capability. The detectors Si-Pin, SiLi and SDD proposed for this energy range have a very good energy resolution, but can only coarsely detect the spatial position of materials.

The detectors mentioned having a high energy resolution (Si-Pin, Si-Li and SDD) require costly cooling of the detector elements, which in real operation is possibly susceptible.

The technical literature discloses numerous detector array arrangements which have a very good spatial resolution and additionally are suitable for photon energies of less than 20 keV. Inter alia, such detectors are described in "Semiconductor Radiation Detectors", Gerhard Lutz (Reference [2]).

One example of a commercially used product is the MYTHEN detector, which was developed by the PSI Paul Scherrer Institut, Switzerland ("Mythen detector system", B. Schmitt et al., Nuclear Instruments and Methods in Physics Research A 501 (2003) 267-272) (Reference [3]). The spacing of the individual detector elements is 50 µm, for example, in the MYTHEN detector.

However, these detector array arrangements mentioned are usable only to a very limited extent for use in a device for identifying materials. Firstly, these detector array arrangements normally have only an energy resolution of the order of magnitude of 1000 eV (FWHM) or higher. This energy resolution does not suffice for many technically relevant material analysis tasks.

Secondly, the so-called charge sharing effect occurs in such detectors—in a manner governed by the sensor construction. The effect describes the circumstance that, potentially, charge carriers generated by an individual X-ray photon are not picked up in their entirety by a single detector element, but rather are detected in subsets by adjacent detector elements. The charge sharing effect is all the greater, the smaller the individual detector elements are structured. If a material sample to be examined contains only a single chemical element, then charge sharing has the effect that the energy distribution of the detected X-ray fluorescence radiation is no longer Gaussian curve-like, but rather becomes highly asymmetrical and has low-energy components. If materials contain a plurality of chemical elements, as is always the case normally in devices for material identification, charge sharing then has the effect that the individual X-ray fluorescence spectra are energetically superimposed on one another and greatly influence one another. The actual strength of the components generated by charge sharing in the energy spectrum depends on many influencing variables. In particular, severe fluctuations of the energy components generated by charge sharing occur if a material sample contains a plurality of chemical elements whose concentrations moreover change spatially and temporally. An energetically highly resolved and also precise and reproducible material analysis by means of X-ray fluorescence radiation is therefore virtually impossible with such detectors.

By contrast, "Position sensitive and energy dispersive x-ray detector based on silicon strip detector technology", P. Wiqcek et al. 2015 JINST 10 P04002 (Reference [4]) discloses a detection arrangement that was developed for applications in X-ray diffractometry. As a commercial product the arrangement is known by the trade name "LYNX-EYE XE-T". Whereas in devices for material analysis the X-ray fluorescence spectra of a multiplicity of chemical elements are normally superimposed on one another simultaneously, a quasi-monochromatic X-ray radiation is present at the location of a detector element in X-ray diffractometry. For diffractometry applications it is of great importance that K-Alpha and K-Beta X-ray radiation components can be reliably separated. The X-ray detector described in Reference [4] makes it possible to completely separate these radiation components solely by means of electronic discrimination. By way of example, X-ray tubes having a Cu anode are used very often in diffractometry. In such systems, the detector is able to precisely differentiate Cu-K-Alpha X-ray radiation (8.04 keV) from Cu-K-Beta X-ray radiation (8.9 keV), specifically without the assistance of a K-Beta beam path filter (Ni filter) or so-called secondary monochromators.

SUMMARY OF THE INVENTION

In contrast with the prior art, the present invention provides a device similar to that described above that can be used to precisely identify individual particles of a material that are situated on a stationary or moving conveyor belt, by means of X-ray fluorescence and with an energy resolution of better than 500 eV (FWHM, relative to an energy of 8.04 keV). If the energy spectra of a plurality of individual chemical elements are superimposed on one another in this case, then they must be able to be precisely separated from the detection unit and the individual spectra are not permitted to influence one another. In addition to the chemical identification, the device is intended at the same time to be able to make possible a spatially high resolved position determination for the individual material particles. In particular, individual material particles are intended to be able to be localized with a spatial resolution of up to better than 50 µm. This spatial resolution is intended to be achieved both in the conveyor belt direction and orthogonally with respect to the conveyor belt direction. The device may also have a large counting rate dynamic range in order to be able to identify and localize material samples whose chemical compositions change spatially and temporally to a great extent.

This is achieved in a manner that is surprisingly simple and effective in equal measure using readily available technical means by virtue of the fact that the individual detector elements of the X-ray detector array have a spatial resolution of 50 µm to 500 µm with a sensitivity to X-ray radiation in an energy range of between 500 eV and 30 keV, with an energy resolution of less than 0.5 keV (FWHM) at counting rates of up to 100 kcps and relative to an energy of 8.04 keV, that the electronic unit comprises a signal channel (which may have in each case a baseline restorer for maintaining the 0 V baseline even in the case of high and moreover temporally changing radiation intensities) for each individual detector element of the X-ray detector array, and that each discriminator unit for a specific detector element is in each case electrically connected to the discriminator units of the detector elements that are spatially directly adjacent to said detector element, wherein all the discriminator units are interconnected with one another via a digital and/or analog circuit in such a way that simultaneous occurrence of signals on more than one detector element can be identified and treated electrically separately.

In particular, the detection arrangement used according to an exemplary embodiment of the invention has the following properties:

- The individual detector elements have a spacing of 75 μm.
- X-ray photons in the range of 1 keV to 30 keV can be detected.
- The energy resolution of an individual detector element is better than 400 eV (FWHM) relative to an energy of 8.04 keV and for counting rates of 0 to 20 kcps per detector element.
- The energy resolution of an individual detector element is better than 500 eV (FWHM) relative to an energy of 8.04 keV and for counting rates of 0 to 100 kcps per detector element. Given a somewhat reduced energy resolution, X-ray photons of up to 1.5 Mcps can be processed. The detector arrangement can thus process global photon counting rates of from 8 Mcps up to more than 200 Mcps depending on the required energy resolution.
- The charge sharing effect is virtually completely eliminated.
- The discriminator thresholds can be set with a resolution of 10 eV and allow a precise selection of X-ray fluorescence spectra of individual chemical elements.
- The sensor substrate need not be cooled in a costly way.

Thus, considerable functional advantages can be afforded by such a detection arrangement for the device for material identification according to the invention. To summarize, it is possible to construct detection systems in which each individual detector element simultaneously has a very large dynamic range and also a very high energy resolution and a very high spatial resolution. Since such a detection system additionally has the ability to eliminate the charge sharing effect, even material samples which contain a plurality of chemical elements can be identified precisely and without mutual spectral influencing with the aid of the X-ray fluorescence analysis.

In one particular embodiment of the invention, individual detector elements are disposed in a planar way and arranged in a strip-shaped fashion, in one or more groups parallel or collinear with respect to one another, and within a group the individual strips are aligned parallel to one another.

Advantageous developments of these embodiments are characterized by the fact that first groups of detector elements may be arranged orthogonally with respect to the conveyor belt direction and the individual strips of said group are arranged parallel to the conveyor belt direction and/or second groups of detector elements are arranged parallel to the conveyor belt direction and the individual strips of said group are arranged orthogonally with respect to the conveyor belt direction. With the aid of such detector element arrangements it is possible to determine the spatial position of material pieces which are situated on a conveyor belt. These arrangements enable a high-resolution spatial determination in the conveyor belt direction or in an orthogonal direction with respect to the conveyor belt direction. The achievable spatial resolution is determined by the spacing of the individual detector elements.

Other variations of the invention are distinguished by the fact that the X-ray detector array is constructed from a combination of first and second groups of detector elements. These detector element arrangements simultaneously enable a high-resolution spatial determination both in the conveyor belt direction and in an orthogonal direction with respect to the conveyor belt direction.

Further advantageous embodiments of the invention are characterized by the fact that at least some of the detector elements are constructed from a silicon strip sensor having a substrate with a thickness of more than 300 μm, in particular 300 μm to 2 mm. Such silicon strip sensors are able to detect X-ray radiation in the energy range of from 0.5 keV up to normally 30 keV and to convert it directly into electrical charge carriers. The construction and the functioning of silicon strip sensors per se are described inter alia in Reference [2].

In certain embodiments of the invention, the discriminator thresholds of each individual detector element group can be set independently of one another, and as a result each group can be allocated one or a plurality of individual energy windows for the detection of the impinging X-ray radiation. This device is thus able to identify X-ray photons whose photon energy corresponds to a predefined energy range. At the same time the device can determine the spatial position of the detected X-ray photons with high resolution, specifically separately for each of the predefined energy ranges.

A further class of embodiments of the invention is distinguished by the fact that the discriminator units of adjacent channels are electrically interconnected with one another via an elimination unit for shared charges signals, wherein each of said elimination units has a parameterizable VETO discriminator threshold, and wherein the elimination unit has the effect that X-ray photons arriving in the X-ray detector array are in each case not counted as an event if they have the consequence that a VETO threshold is exceeded by the electrical output signals of two adjacent signal channels simultaneously. The device is thus able to identify whether the charge sharing effect occurred for an individual X-ray photon, and in such a case can prevent this photon from being registered by the discriminator units as an event. If a material sample contains a plurality of chemical elements, then the individual energy spectra in the resulting overall energy spectrum appear separated from one another as a consequence and no longer energetically influence one another. The term shared charges signals is understood to mean Gaussian curve-like output signals which were generated for X-ray photons for which the charge sharing effect occurred.

Alternatively, in a further class of advantageous embodiments of the invention, the discriminator units of adjacent channels are electrically interconnected with one another via a correction unit for shared charges signals, wherein said correction unit identifies simultaneously occurring Gaussian curve-like output signals in adjacent channels, in such a case forms the sum of the output signal amplitudes, allocates the summation signal determined as a single event to that channel which exhibited the highest signal amplitude, and suppresses the registration of the output signal in the other channel. A device configured in this way can recognize whether the charge sharing effect occurred for an individual X-ray photon, and in such a case can reconstruct the original energy and spatial position of the X-ray photon. If a material sample contains a plurality of chemical elements, then the individual energy spectra in the resulting overall energy spectrum appear separated from one another as a consequence and no longer energetically influence one another.

Other embodiments of the invention are distinguished by the fact that the X-ray detector array is constructed from n>2 groups having in each case an identical strip spacing, the strips are arranged offset from one group to the next group by the distance of the strip spacing divided by n. For the variants of the invention as described further above, the minimum achievable spatial resolution is limited to the spacing of the individual detector elements. The above-mentioned variant of the device according to the invention makes it possible to determine individual materials with a spatial resolution that is smaller than the spacing of two detector elements.

It may also be expedient for the use of the invention if individual groups of detector elements are operated in the TDI ("Time Delay Integration") mode synchronously with the instantaneous speed of the conveyor belt. The counting statistics for the detected X-ray photons are significantly improved by applying the TDI method. As a consequence thereof, the spatial position and also the material composition of a material sample can be determined significantly more precisely in comparison with operation without the TDI method. For some measurement tasks, the improved counting statistics make it possible that the conveyor belt can be operated at higher speeds.

In yet another variation, the sub-channel method is applied to individual groups of detector elements, said method dividing the counting events of each individual physical detector element into more than two virtual signal channels. The achievable spatial resolution of an X-ray detector is normally limited by the spacing of the individual detector elements. By applying the sub-channel method, by contrast, it is possible still to identify changes in the X-ray photon intensity even within a detector element. As a result, the spatial position of material samples moved in the conveyor belt direction and their material structures can be determined even more finely. Moreover, the sub-channel method generates significantly more data points than when this method is not applied. The more data points are present, the more precisely it is possible to reconstruct the spatial position of material pieces with the aid of suitable mathematical algorithms.

A further advantageous embodiment of the device according to the invention is distinguished by the fact that for reading out the digital signals from the counting units, an FPGA ("Field-programmable gate array") or an ASIC ("Application-specific integrated circuit") or a freely programmable controller is provided, in each case in a manner preferably integrated in the detector head. The detector properties described above necessitate a high miniaturization and, moreover, that large volumes of data appertaining to counting events must be read out and processed synchronously with the instantaneous speed of the conveyor belt. This can normally only be realized if the counting events are read out and processed with the aid of FPGA, ASIC or programmable controller components which are arranged in the detector head.

Variants of the invention in a further class of embodiments are distinguished by the fact that one or a plurality of groups of detector elements is (are) not operated as a spatially resolving 1D detector, but rather as a 0D detector arranged in a planar fashion, by virtue of the fact that the counting events of all the individual detector elements within said group(s) are added together and output as a single measurement value. An individual 0D detector is able to detect X-ray fluorescence radiation that occurs in a manner distributed over a comparatively large conveyor belt region. With the exception of the spatial resolution, all the other detector properties mentioned in the previous claims are achieved.

A further advantageous embodiment of the device according to the invention is characterized in that each individual detector element of a group of detector elements can be deactivated. As a result, diverse electronic diaphragms can be defined for the X-ray detector array. With said diaphragms, the X-ray detector array can be optimally adapted to the geometry of different beam paths and individual spatial characteristics.

Finally, the scope of the present invention also includes embodiments in which the X-ray detector is configured such that it can carry out continuously at least 2000 individual measurements per second. Specifically, a high spatial resolution at high belt speeds can be achieved only if the X-ray detector array is able to carry out a high number of individual measurements per second.

Further advantages of the invention are evident from the description and the drawings. Likewise, the features mentioned above and those that will be explained even further can be used according to the invention in each case individually by themselves or as a plurality in arbitrary combinations. The embodiments shown and described should not be understood as an exhaustive enumeration, but rather have exemplary character for portraying the invention.

BRIEF DESCRIPTION OF THE DRAWINGS

FIGS. 2A to 2C schematically illustrate an alternative embodiment of the device according to the invention.

DETAILED DESCRIPTION

FIGS. 1A to 1E schematically illustrate a first embodiment of the device according to the invention.

Figure 1A:
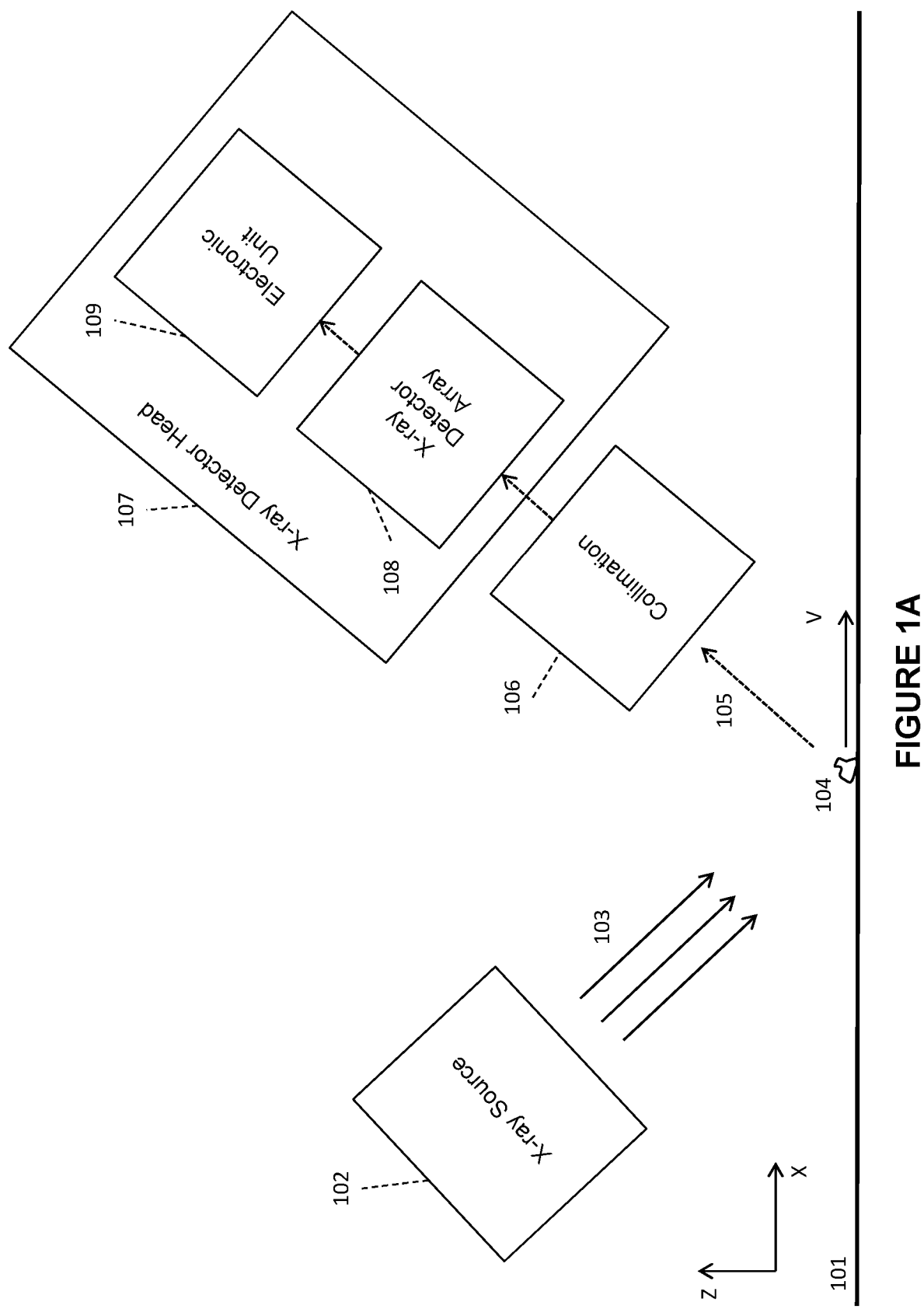
FIGS. 1A to 1E schematically illustrate a first embodiment of the device according to the invention.

FIG. 1A shows an X-ray source 102, which emits X-ray radiation 103 and irradiates an individual material piece 104 with said X-ray radiation, which material piece can be moved by means of a conveyor belt 101. The X-ray fluorescence radiation 105 excited by the material particle is usually guided through a collimation unit 106 and impinges on an X-ray detector head 107. The latter contains the X-ray detector array 108 and an electronic unit 109 for reading out and processing the signals from the X-ray detector array.

Figure 1B:
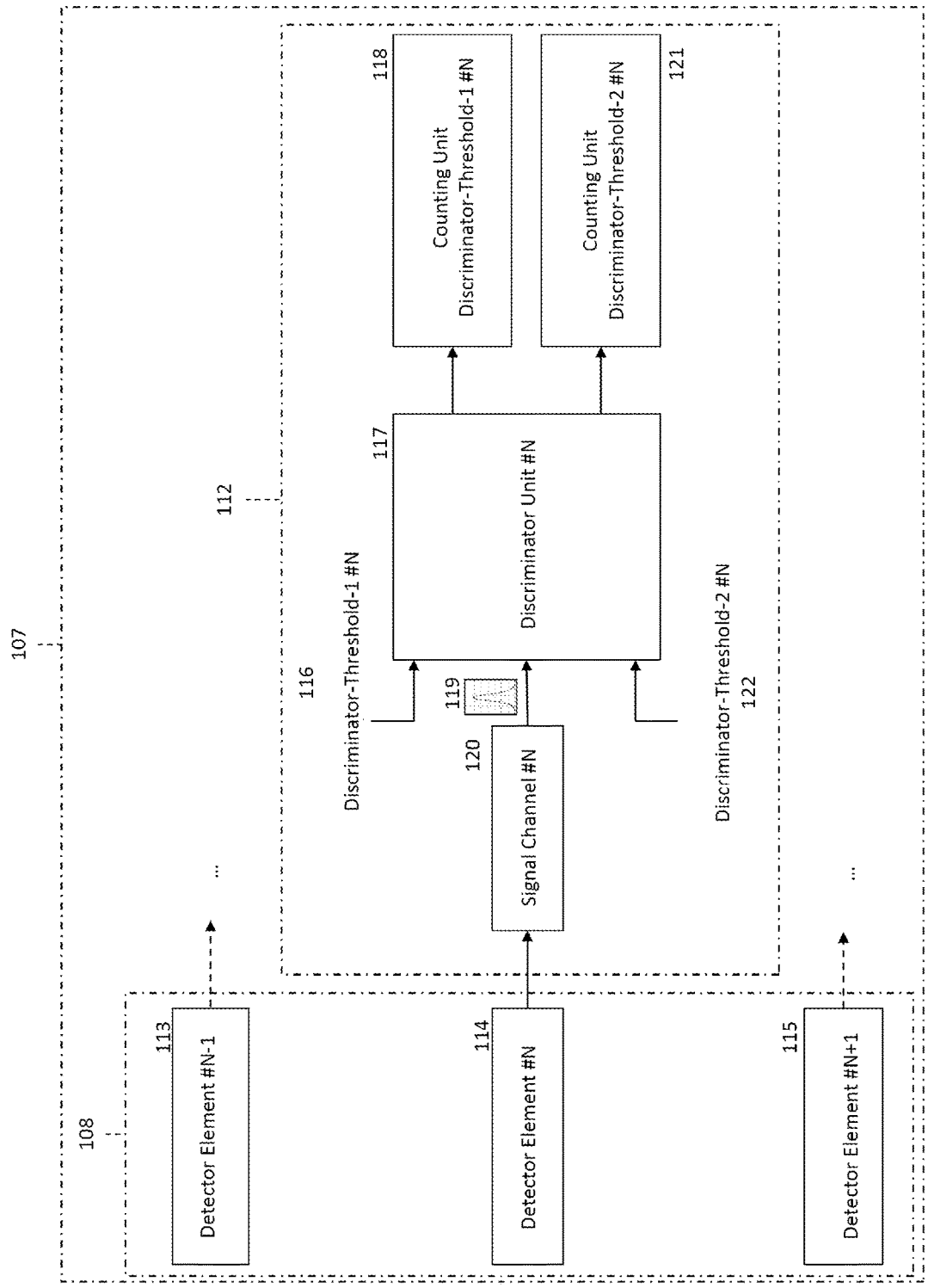

FIG. 1B shows the individual functional units within the detector head 107. Each individual detector element 114 of the X-ray detector array 108 is interconnected with an individual electronic sub-unit 112 consisting of a signal channel 120, a discrimination unit 117 and a plurality of counting units. The signal processing for detector element # N is illustrated by way of example. The signal channel converts the analog output signals of the detector element into Gaussian curve-like signals 119, which are converted into digital counting events in the discriminator unit. Each discriminator unit has at least two adjustable discriminator thresholds and each discriminator threshold is assigned a respective counting unit. In this example, the counting unit 118 counts all Gaussian curve-like signal events which exceed the discriminator threshold-1 116; counting unit 121 adds up all signal events which exceed the discriminator threshold-2 122.

Figure 1C:
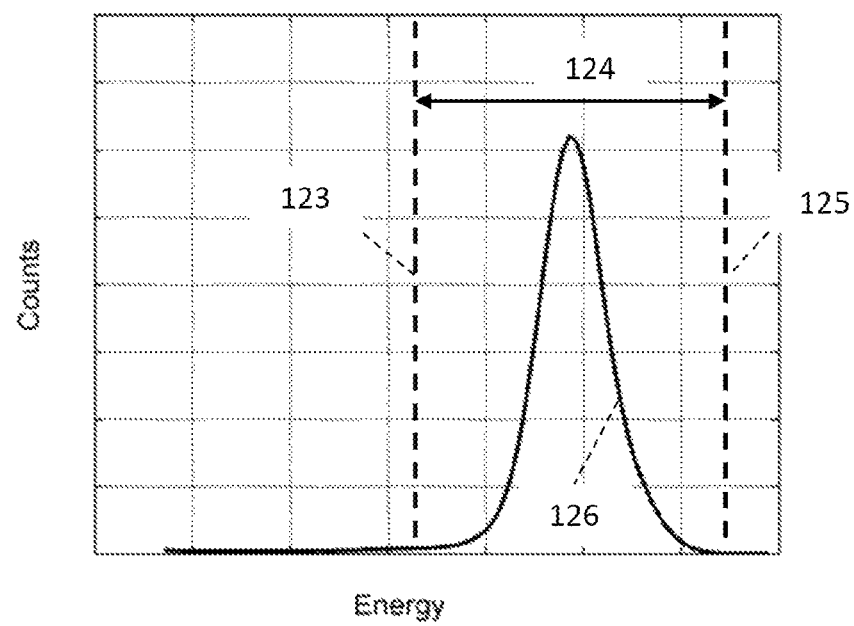

FIG. 1C shows by way of example a histogram 126 having a typical frequency distribution of the amplitudes of the analog Gaussian curve-like time signals 119. The number (Counts) of the individual time signals which have a specific amplitude is plotted. Since the amplitude of the Gaussian curve-like signals is proportional to the energy (Energy) of the detected X-ray photons, this histogram is likewise an image of the energy distribution of the individual X-ray photons which have been detected in the detector element # N 114. Discriminator threshold-1 is normally chosen to the left of the maximum of the Gaussian curve-like histogram curve, for example at position 123. Discriminator threshold-2 is usually set to the right thereof, that is to say for example at position 125. In general, the aim is to detect all radiation events which lie in an energy window 124 defined thereby. It was assumed in this representation that no charge sharing occurs in the detector element.

Figure 1D:
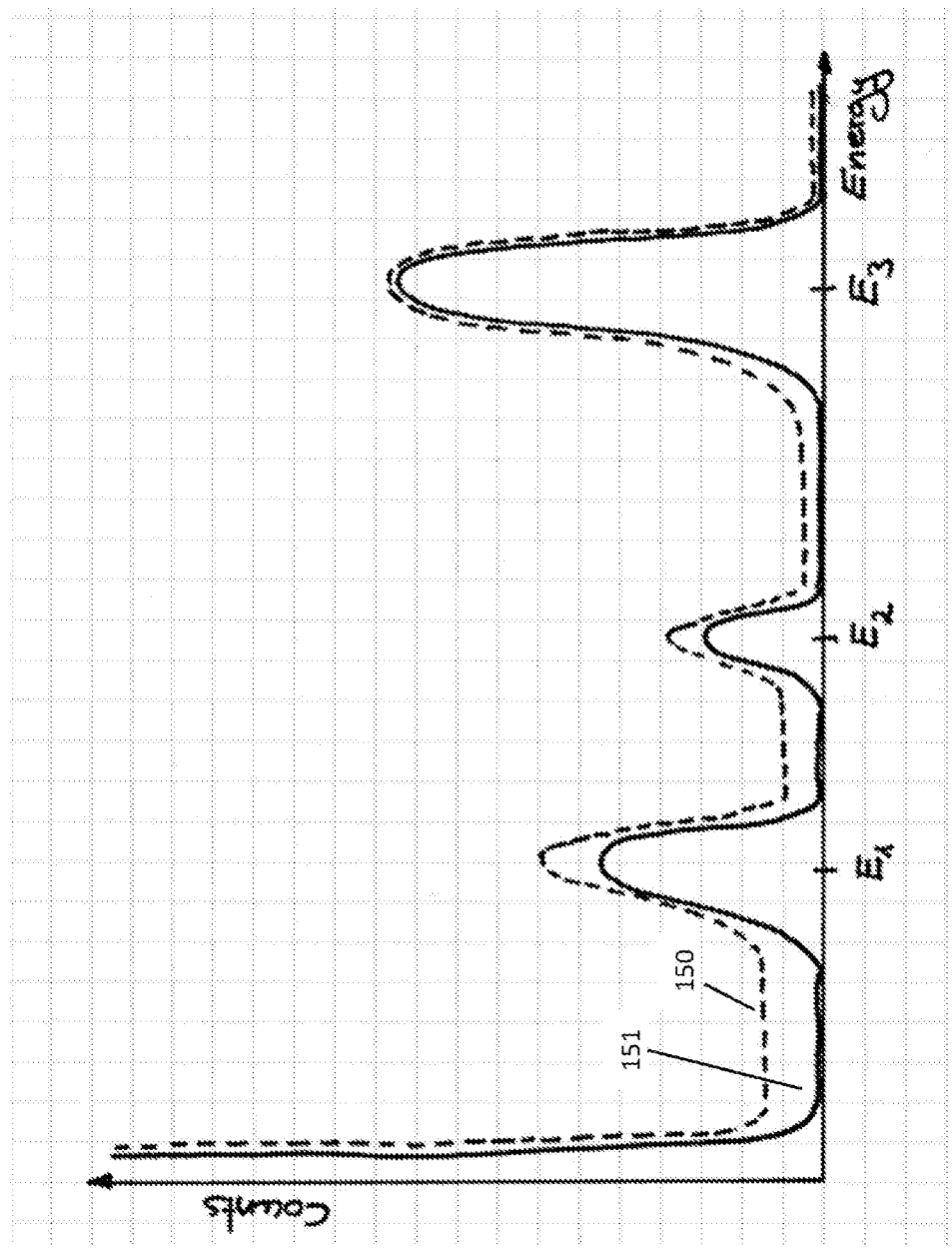

FIG. 1D shows by way of example a histogram for the signal amplitudes at the location 119 and for the case where the X-ray radiation registered in detector element # N 114 is composed of X-ray photons of the energies E1, E2 and E3.

If no charge sharing occurred, then the histogram would correspond to the profile 151. However, since charge sharing is normally unavoidable and generated charge carriers are consequently divided between adjacent detector elements, the real histogram shows a distribution as indicated in profile 150. Owing to charge sharing, the energy distribution of the X-ray photons having the energy E3 becomes asymmetrical and has low-energy components. The latter are superimposed with the energy distributions of the X-ray photons of the energies E1 and E2 and change the energy spectra thereof. The same applies to the energy distributions for the X-ray photons of the energies E2 and E1. These also become asymmetrical and in turn have low-energy components. The low-energy components of the photons of the energy E2 are superimposed with the energy distribution of the photons of the energy E1.

Figure 1E:
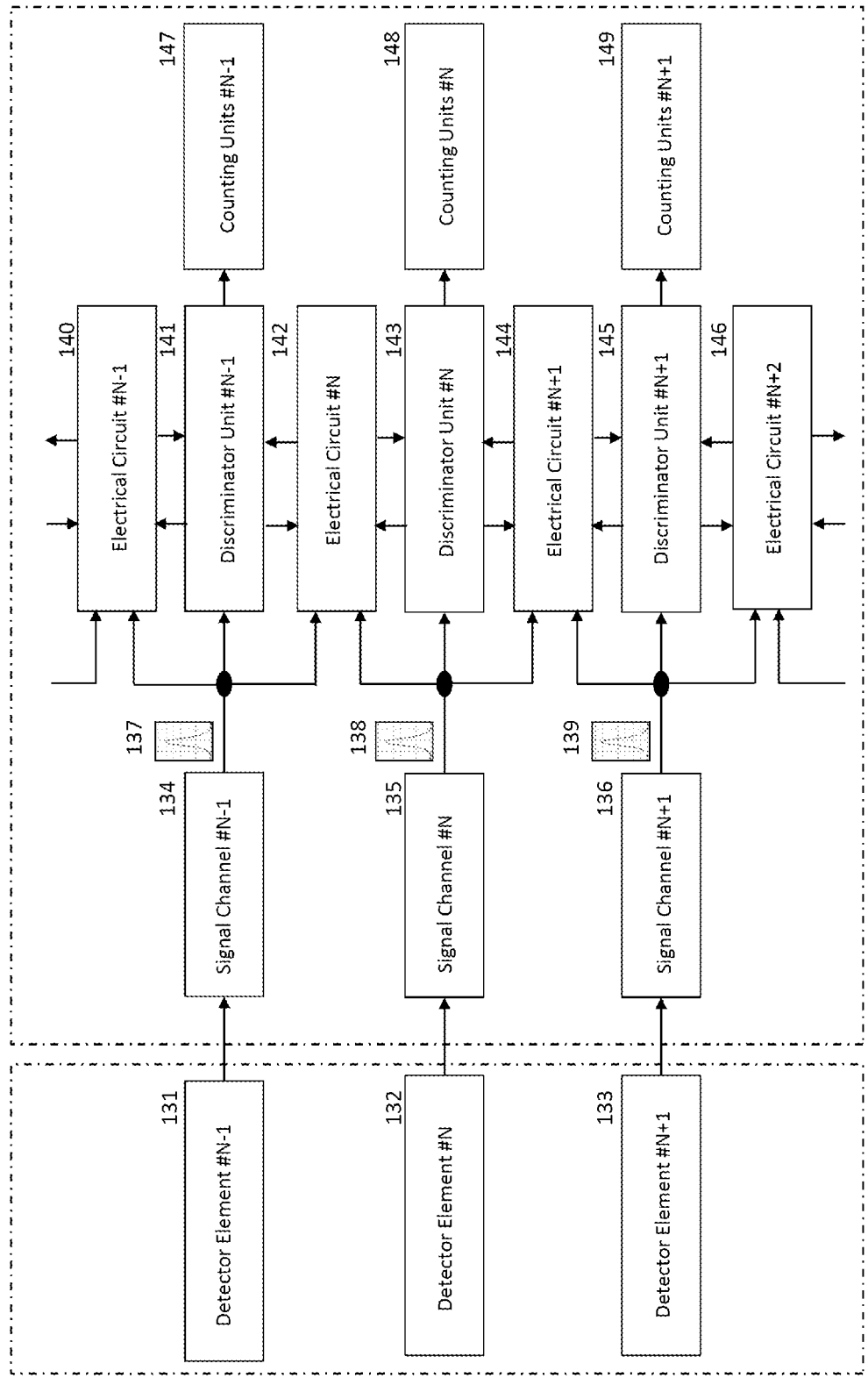

FIG. 1E schematically illustrates how the individual discriminator units of a first embodiment of the device according to the invention are coupled to one another. The discriminator units of spatially directly adjacent detector elements are interconnected with one another via electrical circuits such that simultaneous occurrence of signals on more than one detector element is identified, treated electrically separately and registered separately in the counting units. By way of example, the electrical circuit # N 142 is able to identify simultaneously occurring events in the detector elements # N–1 and # N (131 and 132) and to treat them separately. As a result of this electronic correction, the energy spectra registered by the individual discriminator units no longer contain any low-energy charge sharing components. If it is assumed by way of example that the energy distribution at the location 138 has a profile corresponding to 150 in FIG. 1D, then the energy spectrum registered by the discriminator unit # N 143 after electronic correction has a profile in accordance with 151 in FIG. 1D. The histograms for the individual photon energies appear completely separated from one another and no longer influence one another energetically.

Figure 2A:
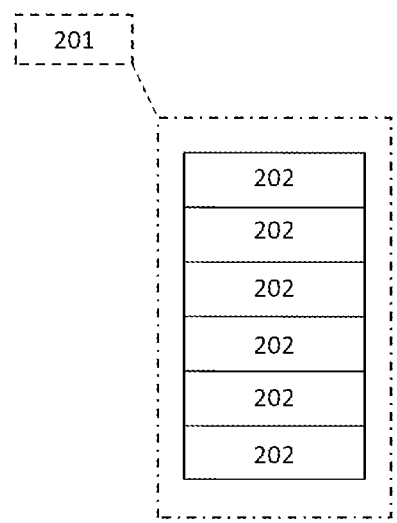
Figure 2B:
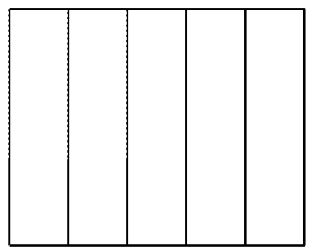
Figure 2B:
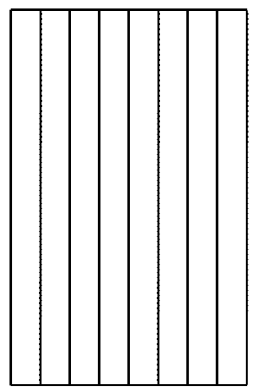
Figure 2B:
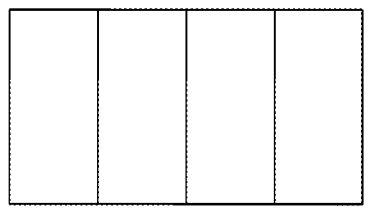

One embodiment of the device according to the invention is illustrated in FIGS. 2A to 2C. Accordingly, the individual detector elements 202 arranged in a planar fashion are strip-shaped and can be arranged in a single group 201 or in a plurality of groups 203, 204 and 205 parallel to one another. The individual detector element groups can also be arranged collinearly, as illustrated for example by 206 and 207. Within a group, the individual strips are preferably aligned parallel to one another.

Figure 3A:
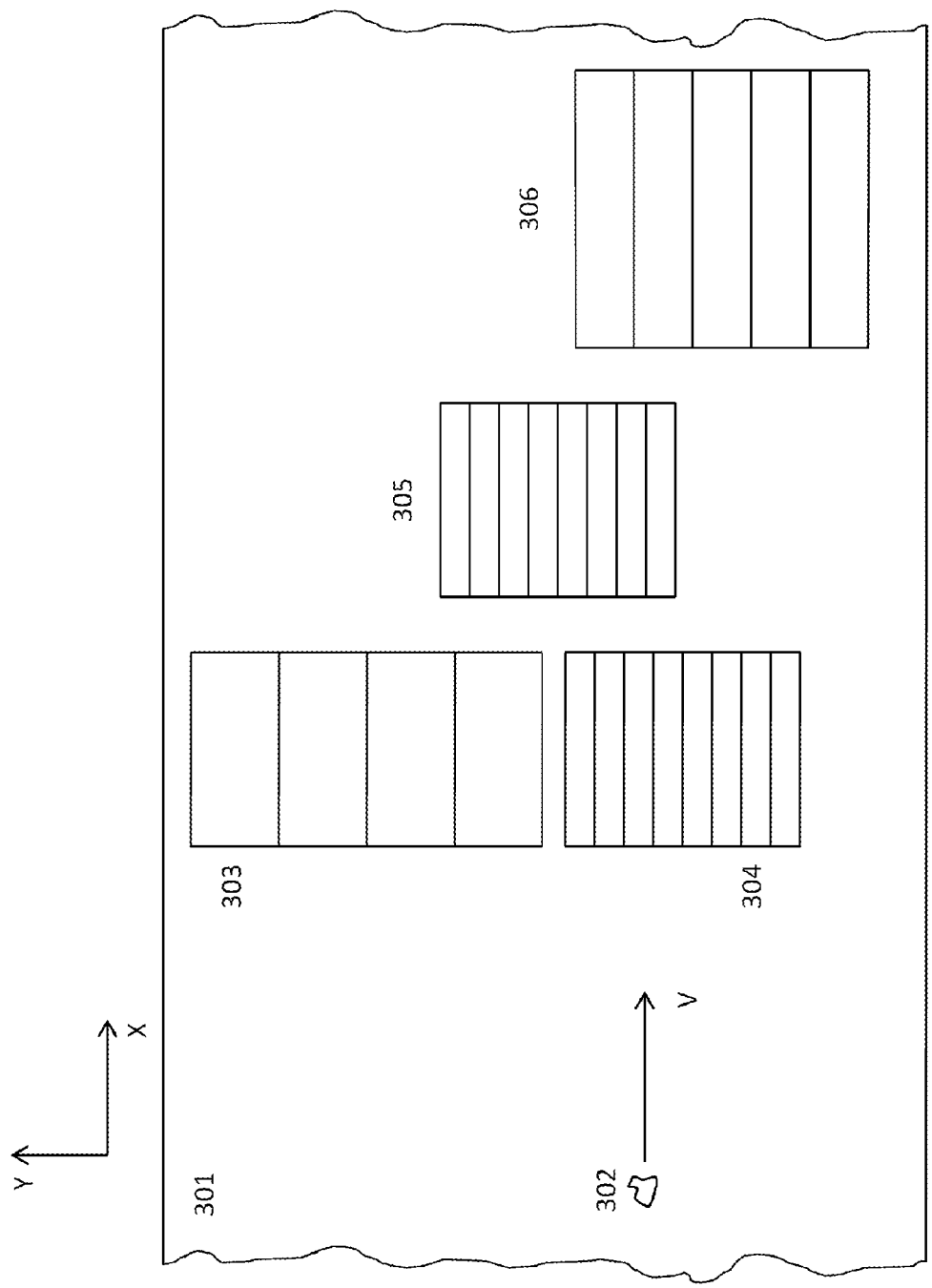
FIGS. 3A and 3B show another alternative embodiment of the device according to the invention.
Figure 3B:
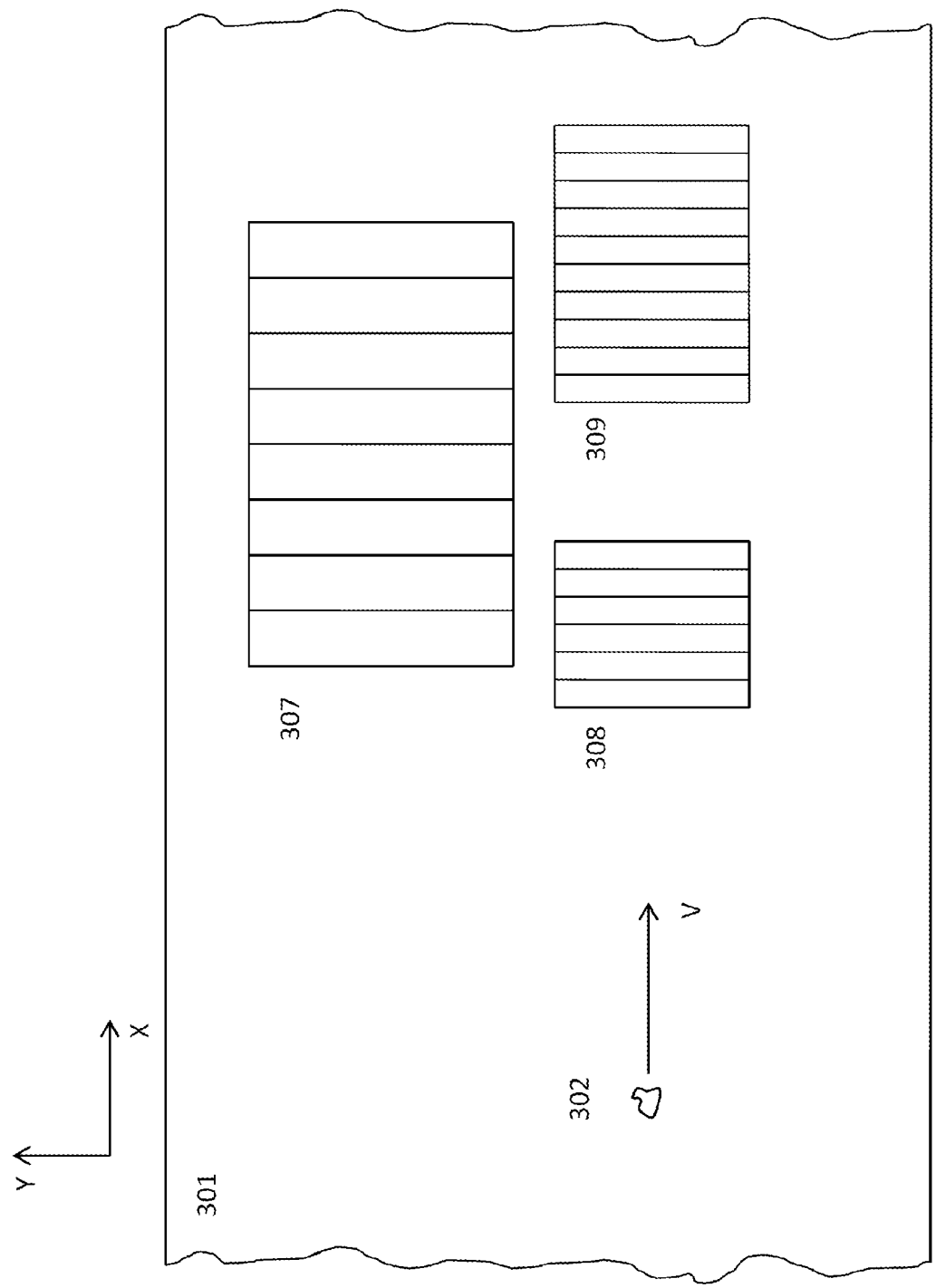

FIGS. 3A and 3B show one embodiment of the device according to the invention. By way of example, a material piece 302 is situated on a conveyor belt 301 and moves toward the detector elements at the speed v.

First groups of detector elements 303, 304, 305 and 306 are aligned orthogonally with respect to the conveyor belt direction. The individual strips of said groups are oriented parallel to the conveyor belt direction. Second groups of detector elements 307, 308 and 309 are arranged parallel to the conveyor belt direction. The individual strips of said second group are orthogonal with respect to the conveyor belt direction.

Figure 4:
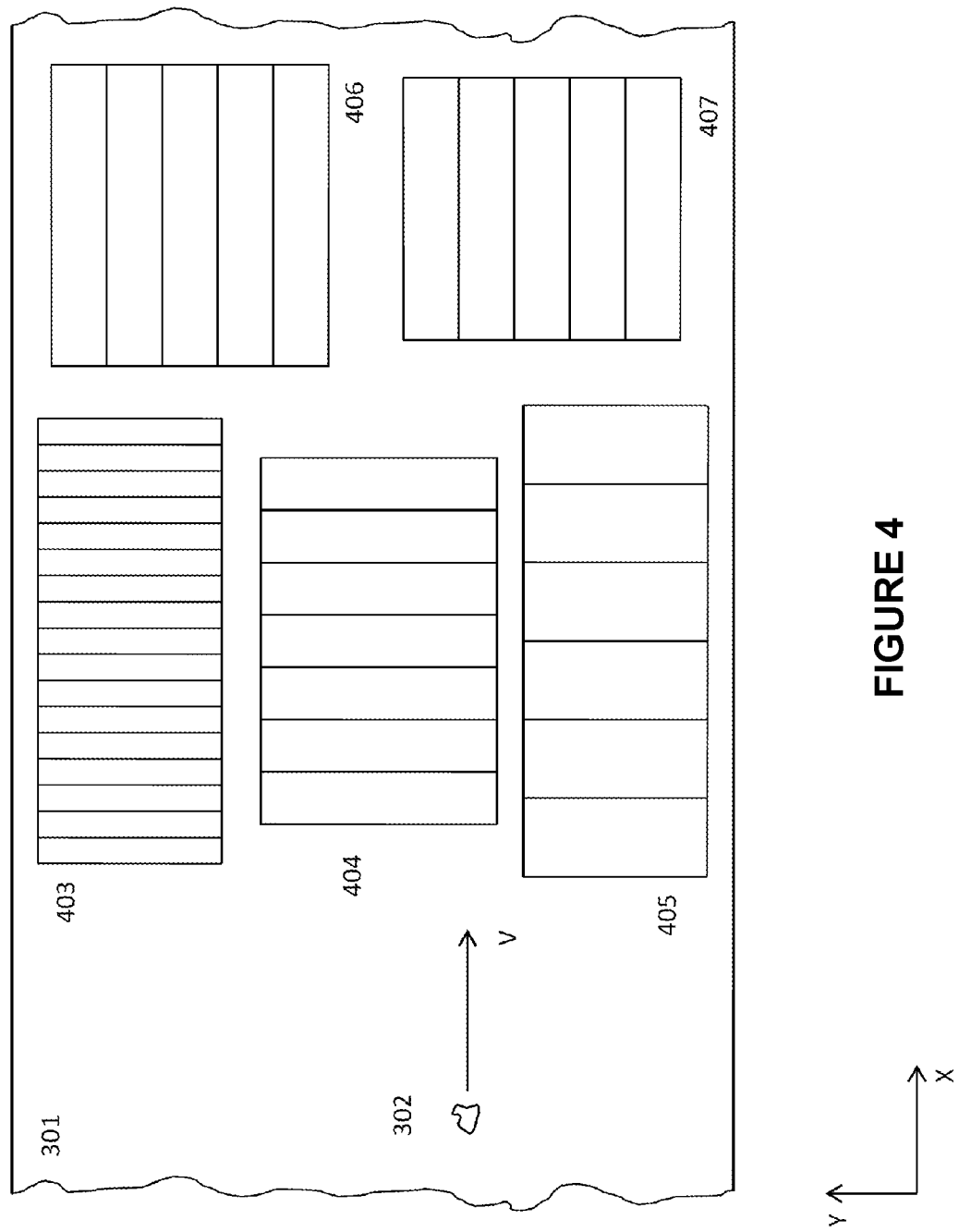
FIG. 4 shows an embodiment of the device according to the invention which is characterized by the fact that the X-ray detector array is constructed from a combination of first 406-407 and second 403-405 groups of detector elements.

FIG. 4 shows one embodiment of the device according to the invention which is characterized by the fact that the X-ray detector array is constructed from a combination of first 406-407 and second 403-405 groups of detector elements.

Figure 5:
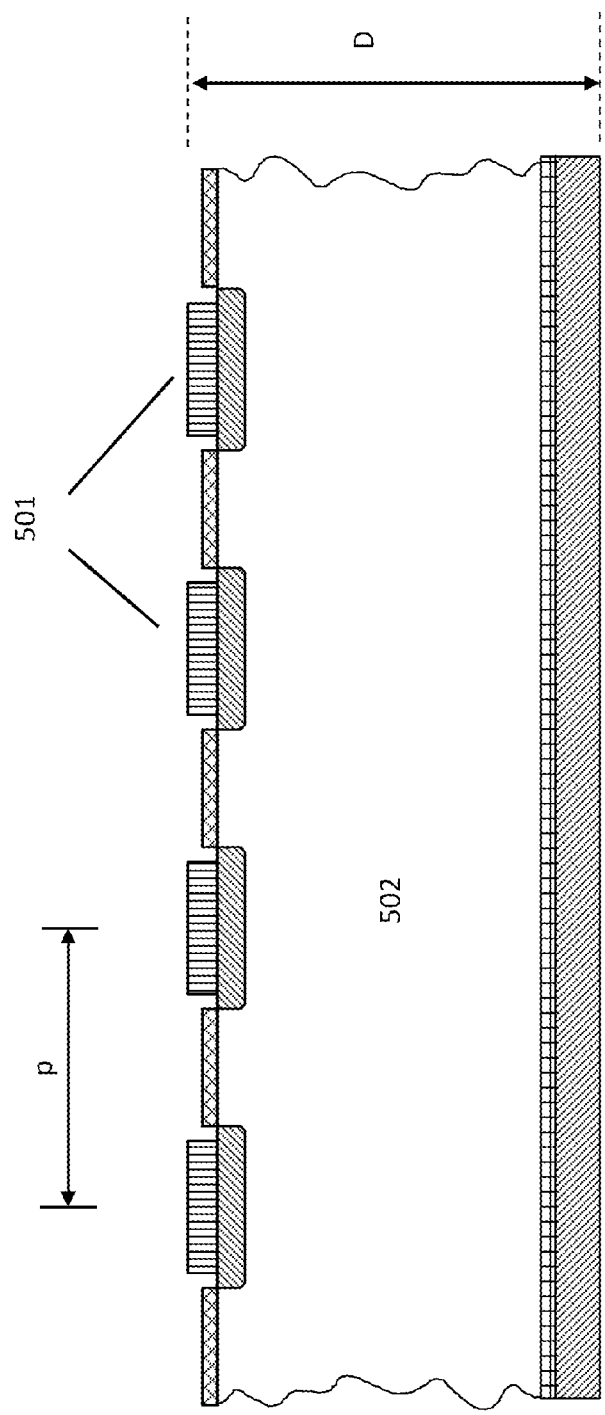
FIG. 5 shows one embodiment of the device according to the invention in which the detector elements 501 are embodied as a silicon strip sensor.

FIG. 5 shows one embodiment of the device according to the invention in which the detector elements 501 are embodied as a silicon strip sensor whose semiconductor substrate 502 has a thickness D. The spacing of the individual detector elements has the distance p.

Figure 6A:
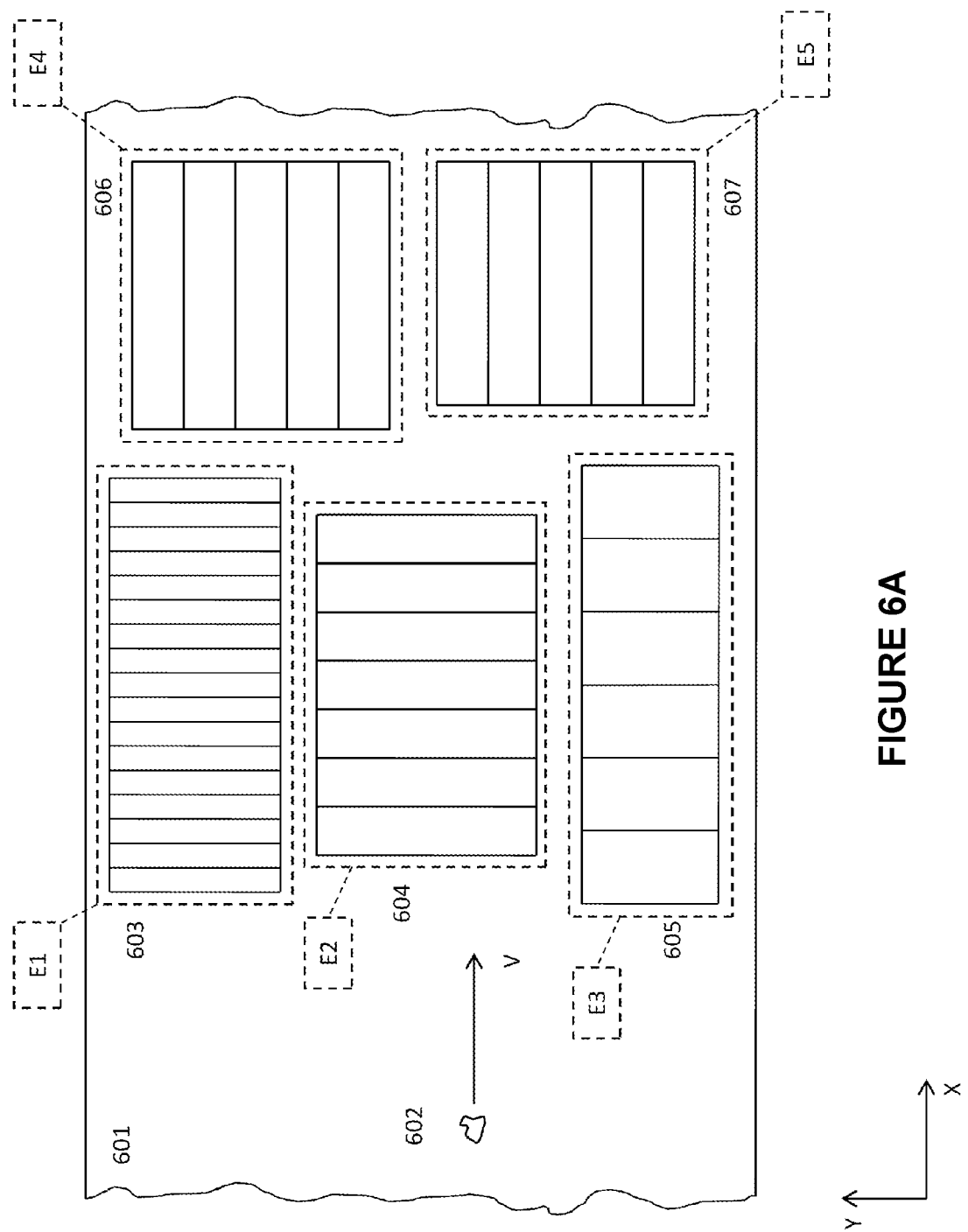
FIGS. 6A and 6B show one embodiment of the device according to the invention which is characterized by the fact that the discriminator thresholds of each individual detector element group 603 to 607 can be chosen independently of one another.
Figure 6B:
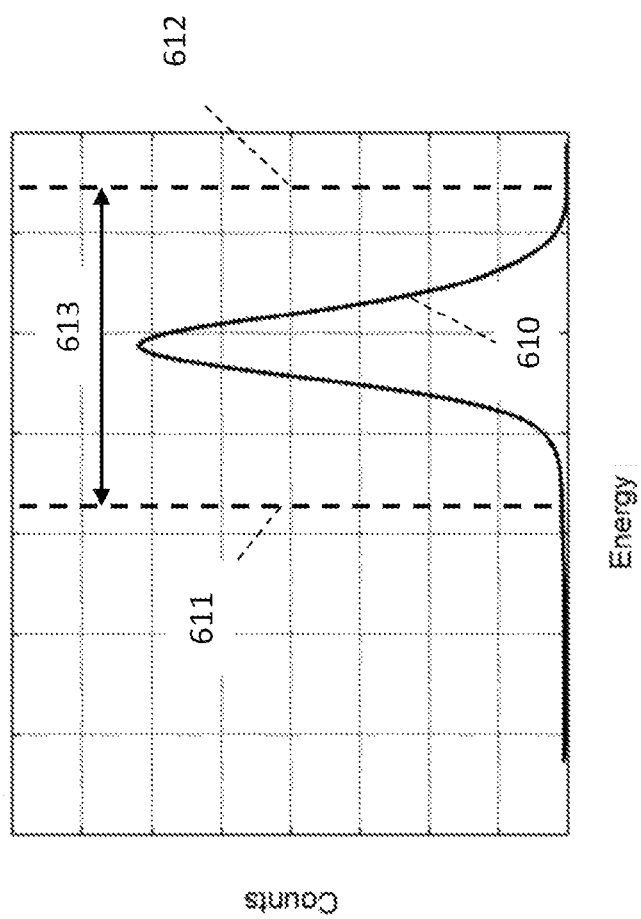

FIGS. 6A and 6B show one embodiment of the device according to the invention which is characterized by the fact that the discriminator thresholds of each individual detector element group 603 to 607 can be chosen independently of one another, and that as a result each group can be allocated individual energy windows for the detection of the impinging X-ray radiation. It is assumed in this example that each of the groups mentioned has two globally adjustable discriminator thresholds 611 and 612 and thus an energy window 613. Consequently, a dedicated energy window E1, E2, E4 or E5 can be defined for each of the groups mentioned.

Figure 7A:
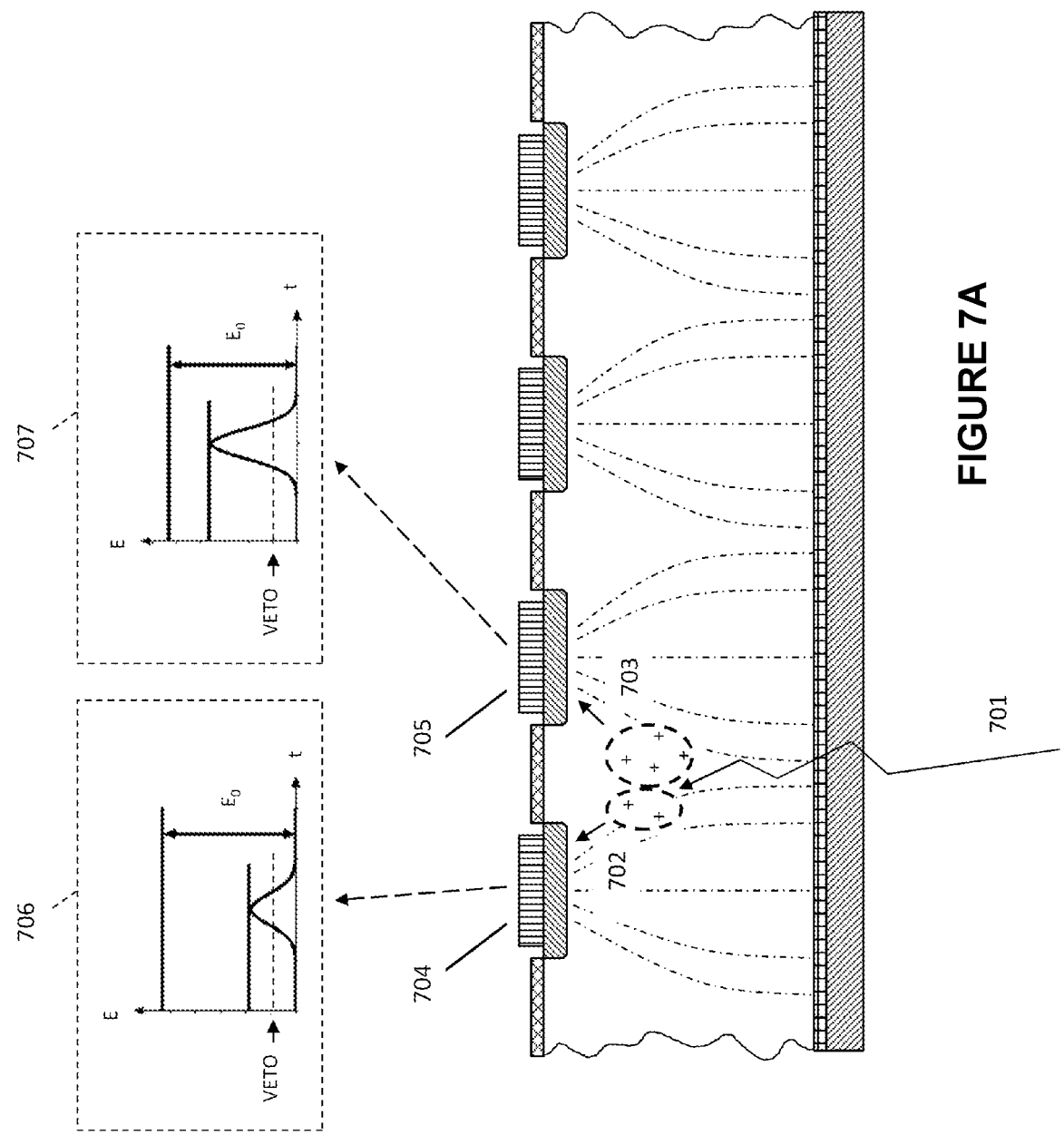
FIGS. 7A to 7C illustrate the functioning of one embodiment of the device according to the invention which is characterized by the fact that the discriminator units of adjacent channels are electrically interconnected with one another via an elimination unit for shared charges signals.
Figure 7B:
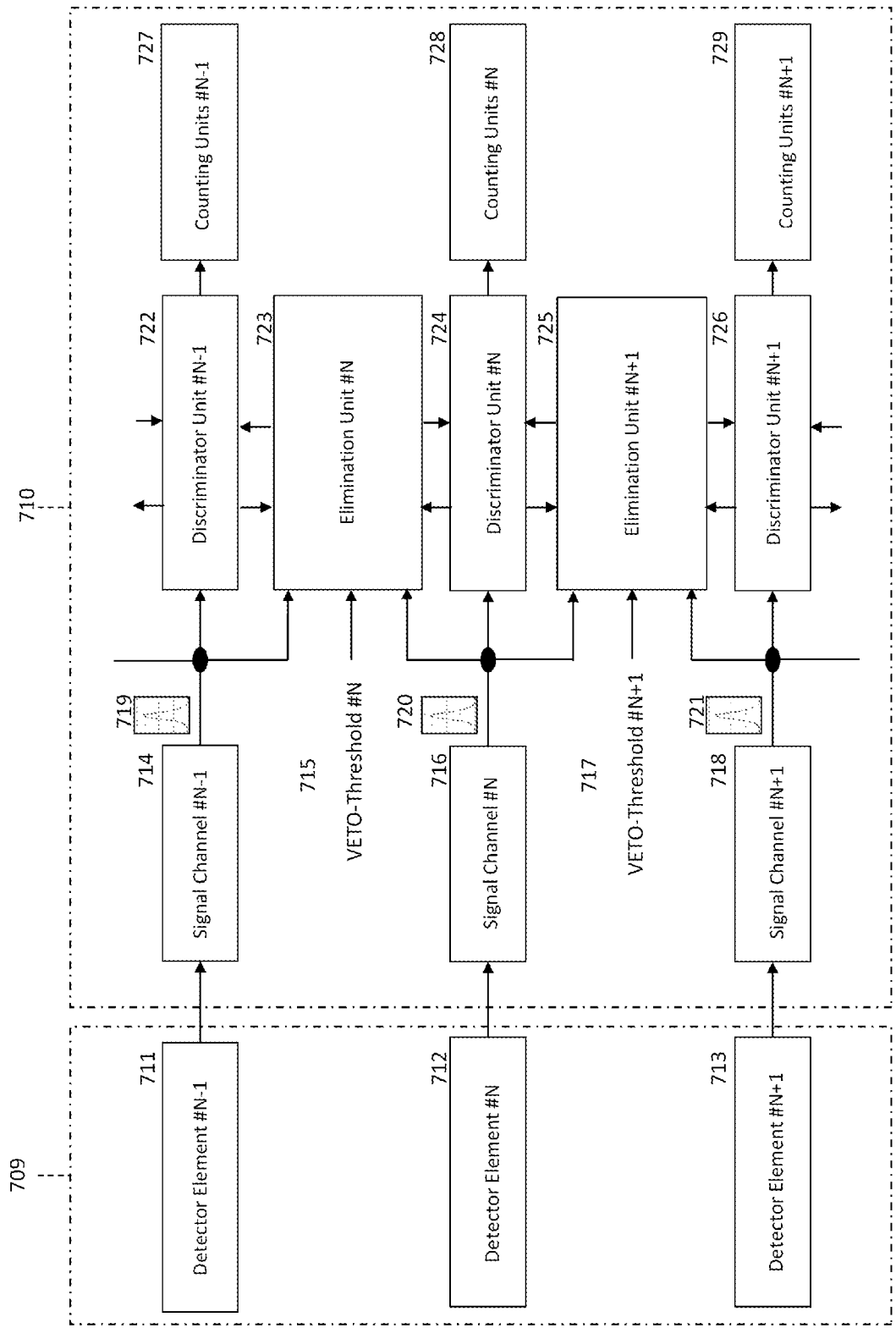
Figure 7C:
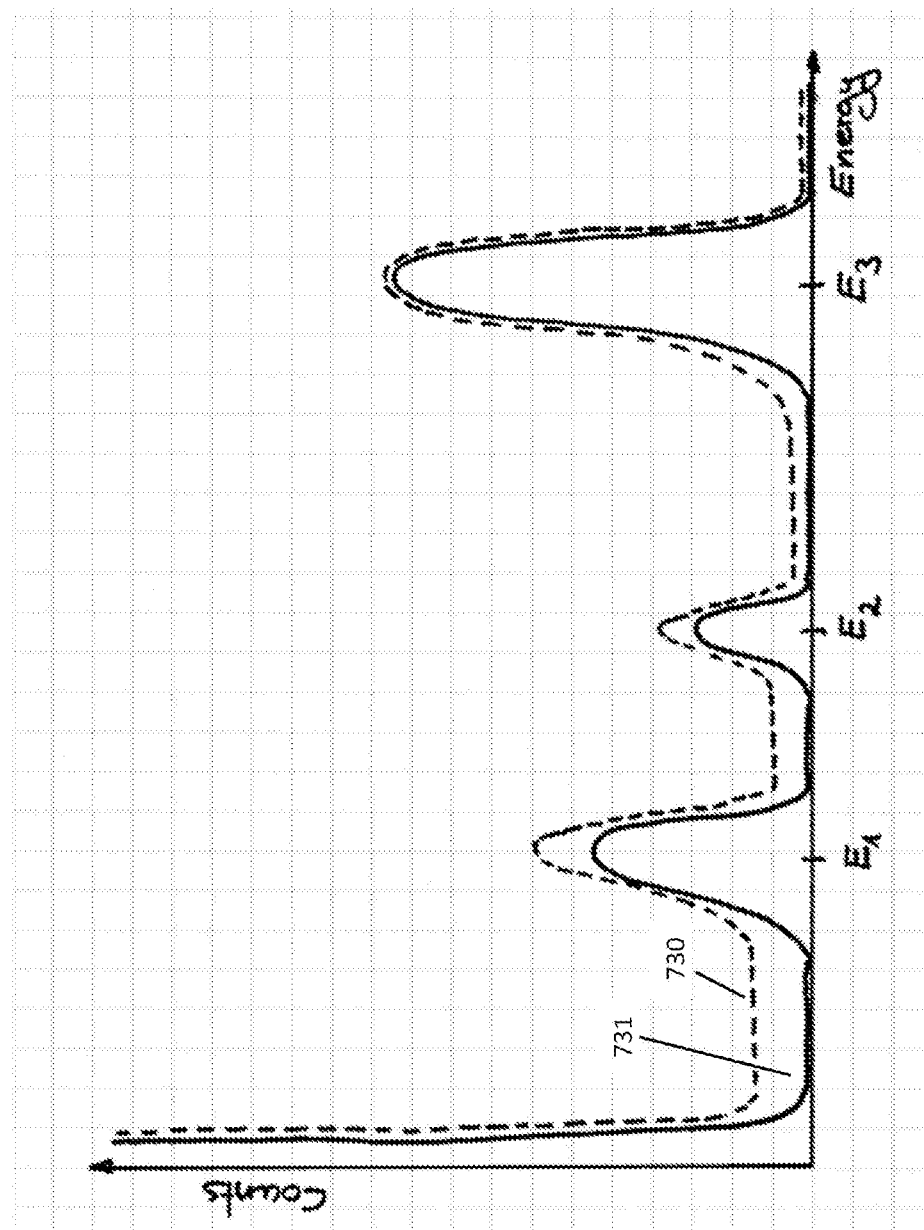

FIGS. 7A to 7C illustrate the functioning of one embodiment of the device according to the invention which is characterized by the fact that the discriminator units of adjacent channels are electrically interconnected with one another via an elimination unit for shared charges signals.

FIG. 7A shows by way of example an X-ray photon 701 having the energy $E_0$, which photon generates electrical charge carriers in the sensor substrate. On account of charge sharing, the charge carriers generated are distributed between two adjacent detector elements. A first subset 702 of said charge carriers is received by detector element 704, and a second subset 703 by detector element 705. The time signal 706 is generated at the output of the signal channel of detector element 704, and the time signal 707 is generated at the output of the signal channel of detector element 705. The sum of the signal amplitudes corresponds to the original photon energy $E_0$. This embodiment of the device prevents the registration of an individual X-ray photon if the latter has the consequence that the preset VETO threshold is exceeded by the output signals of two adjacent detector elements simultaneously. Such a photon is accordingly not counted as an event in any of the individual counting units.

FIG. 7B shows the particular construction of the electronic interface unit 710 for this embodiment of the device according to the invention. A respective elimination unit is interposed between the discriminator units of two adjacent channels. In this example, discriminator unit # N is linked with the elimination units # N and # N+1. Each elimination unit additionally receives as input signals the two analog output signals of the adjacent signal channels and also a freely parameterizable VETO discriminator threshold. In the example, the output signals 719 and 720 and also the VETO threshold # N are passed to the elimination unit # N. The same correspondingly applies to the elimination unit # N+1. The output signal 720 is not registered and counted as a result if at the same time, in the case of output signal 719, an event occurs which exceeds the VETO threshold # N just like the output signal 720. The same correspondingly holds true if the output signals 720 and 721 simultaneously exceed the VETO threshold # N+1.

FIG. 7C shows the histogram profile for the output signal 720 of detector element # N. A typical energy distribution 730 is shown by way of example for the case where X-ray photons of the energies E1, E2 and E3 act simultaneously on the detector element # N (712) and the charge sharing effect occurs. The elimination units # N and # N+1 have the effect that the energy spectrum registered by the discriminator unit # N has a profile in accordance with 731 in FIG. 7C. The histograms for the individual photon energies appear completely separated from one another and no longer influence one another energetically.

Figure 8A:
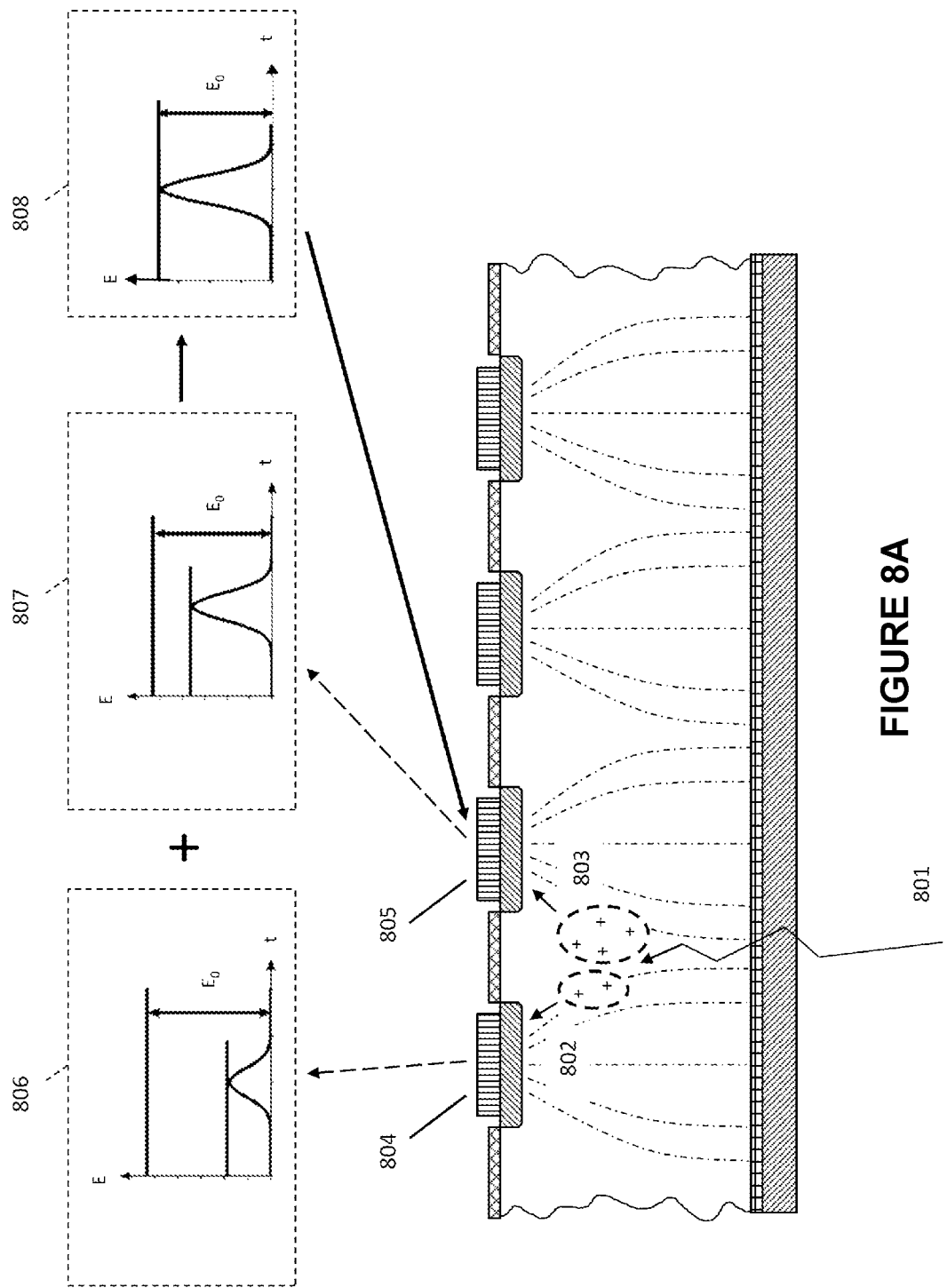
FIGS. 8A to 8C illustrate the functioning of one embodiment of the device according to the invention which is characterized by the fact that the discriminator units of adjacent channels are electrically interconnected with one another via a correction unit for shared charges signals.
Figure 8B:
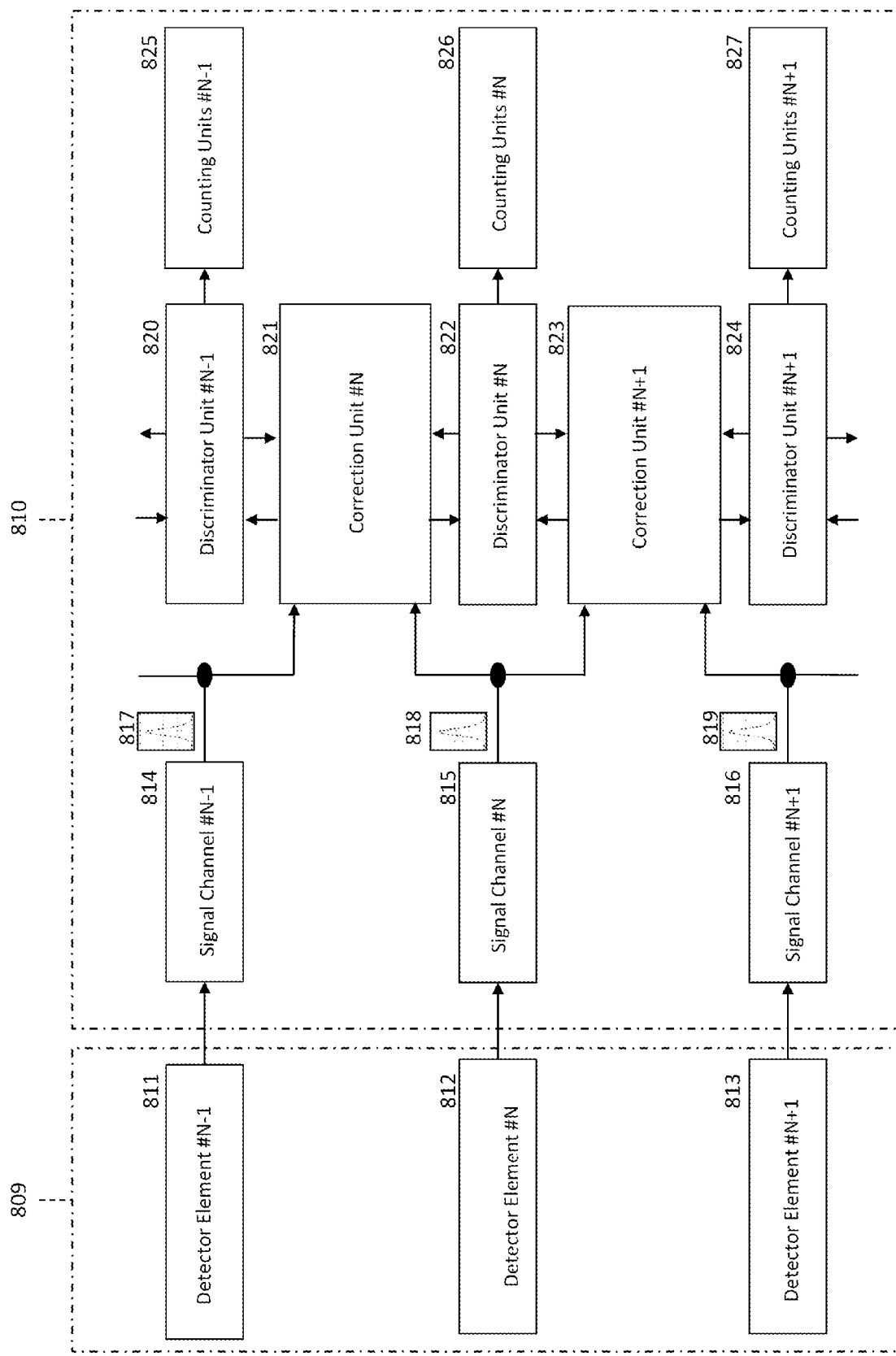
Figure 8C:
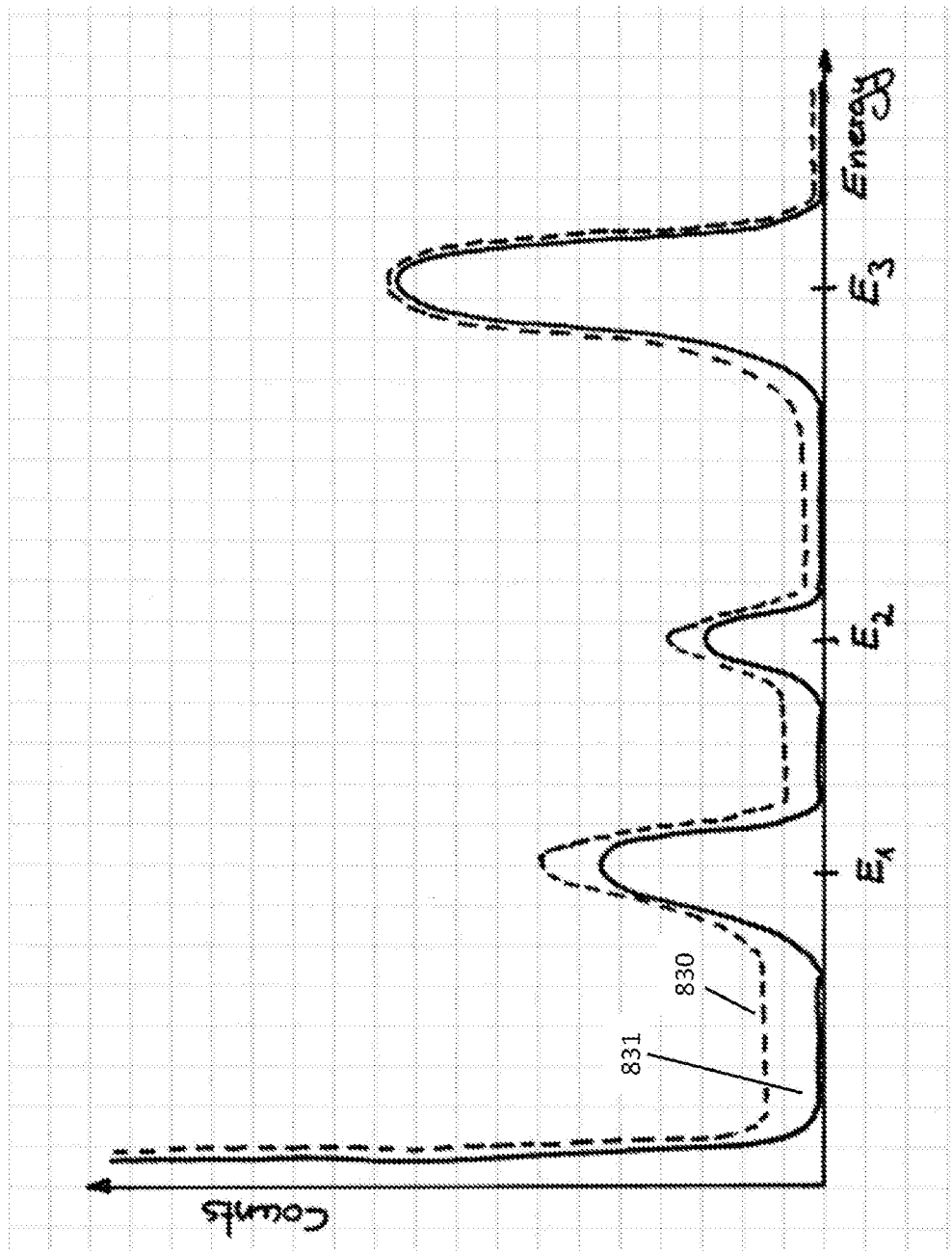

FIGS. 8A to 8C illustrate the functioning of one embodiment of the device according to the invention which is characterized by the fact that the discriminator units of adjacent channels are electrically interconnected with one another via a correction unit for shared charges signals.

FIG. 8A shows by way of example an X-ray photon 801 having the energy $E_0$, which photon generates the time signal 806 at the output of the signal channel of detector element 804 and the time signal 807 at the output of the signal channel of detector element 805 on account of charge sharing. This embodiment recognizes if charge carriers of an individual X-ray photon are distributed between two adjacent detector elements, and reconstructs the original photon energy by addition of the time signals 806 and 807. The reconstructed event is assigned to that detector element whose time signal had the highest amplitude. In the example, the reconstructed summation signal 808 is allocated to the detector element 805.

FIG. 8B shows the particular construction of the electronic interface unit for this embodiment of the device according to the invention. A respective correction unit is interposed between the discriminator units of two adjacent channels. In this example, discriminator unit # N is linked with the correction units # N and # N+1. Each correction unit additionally receives as input signals the two analog output signals of the adjacent signal channels. In the example, the signals 817 and 818 are passed to the correction unit # N. The same correspondingly applies to the correction unit # N+1. A signal 818 is not registered and counted as an event by discriminator unit # N if at the same time, in the case of 817, an event occurs whose amplitude is higher than that of the signal 818. In this case, the correction unit # N forms the sum of the amplitudes of the signals 817 and 818 and allocates this summation event to the discriminator unit # N−1. It can thus be registered by the counting units # N−1. The summation event is correspondingly allocated to the discriminator unit # N if the signal amplitude 818 is greater than that of signal 817.

FIG. 8C shows the histogram profile for the output signal 818 of detector element # N. A typical energy distribution 830 is shown by way of example for the case where X-ray photons of the energies E1, E2 and E3 act simultaneously on the detector element # N (812) and the charge sharing effect occurs. The correction units # N and # N+1 have the effect that the energy spectrum registered by the discriminator unit # N has a profile in accordance with 831 in FIG. 8C. The histograms for the individual photon energies appear completely separated from one another and no longer influence one another energetically.

FIGS. 9A to 9E illustrate the functioning of one embodiment of the device according to the invention which is characterized by the fact that the X-ray detector array is constructed from n>2 groups having in each case an identical strip spacing, and the strips are arranged offset from one group to the next group by the distance of the strip spacing divided by n.

Figure 9A:
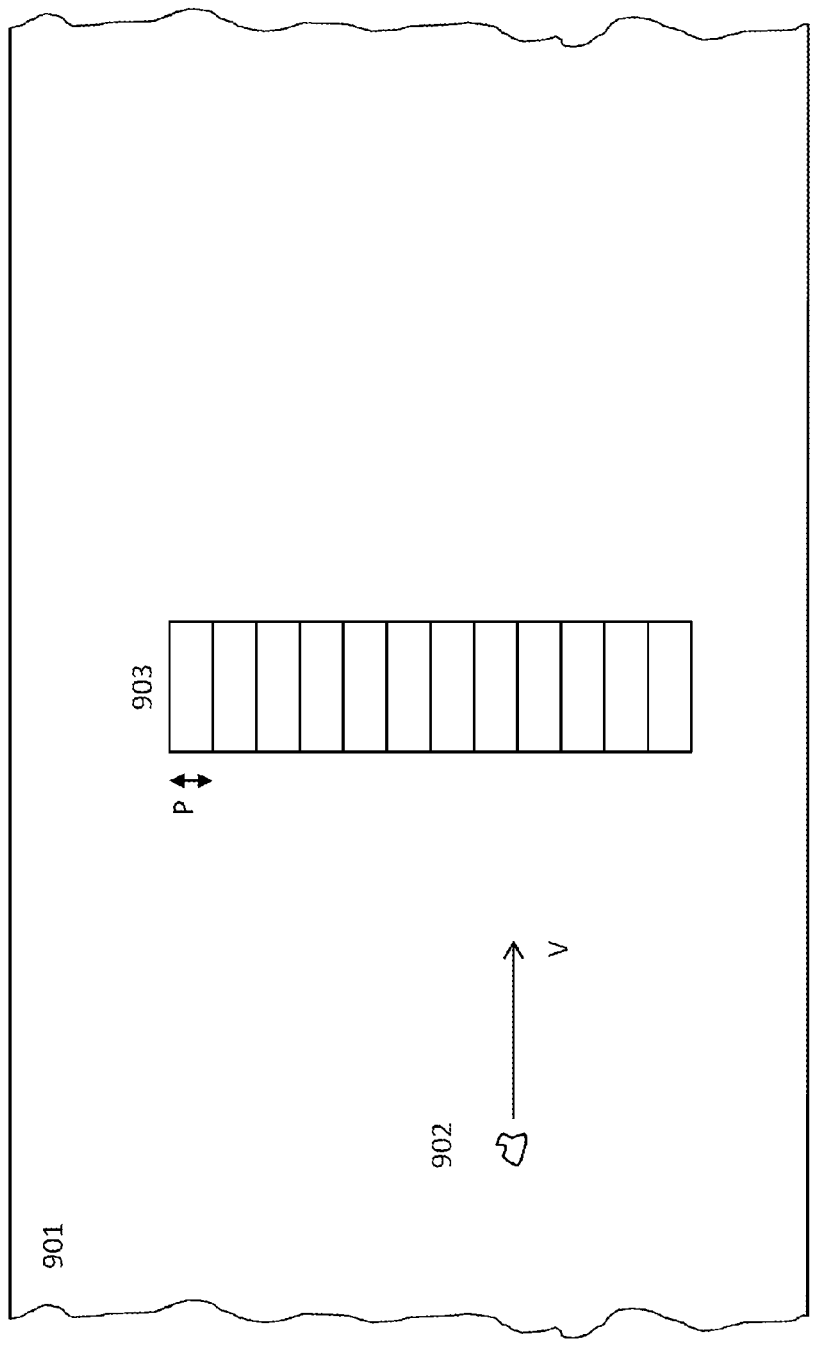
FIGS. 9A to 9E illustrate the functioning of one embodiment of the device according to the invention which is characterized by the fact that the X-ray detector array is constructed from n>2 groups having in each case an identical strip spacing, and the strips are arranged offset from one group to the next group by the distance of the strip spacing divided by n.

FIG. 9A shows by way of example a material piece 902 which moves toward a detector element group 903 at the speed v. The spacing of the detector elements amounts to the distance p.

Figure 9B:
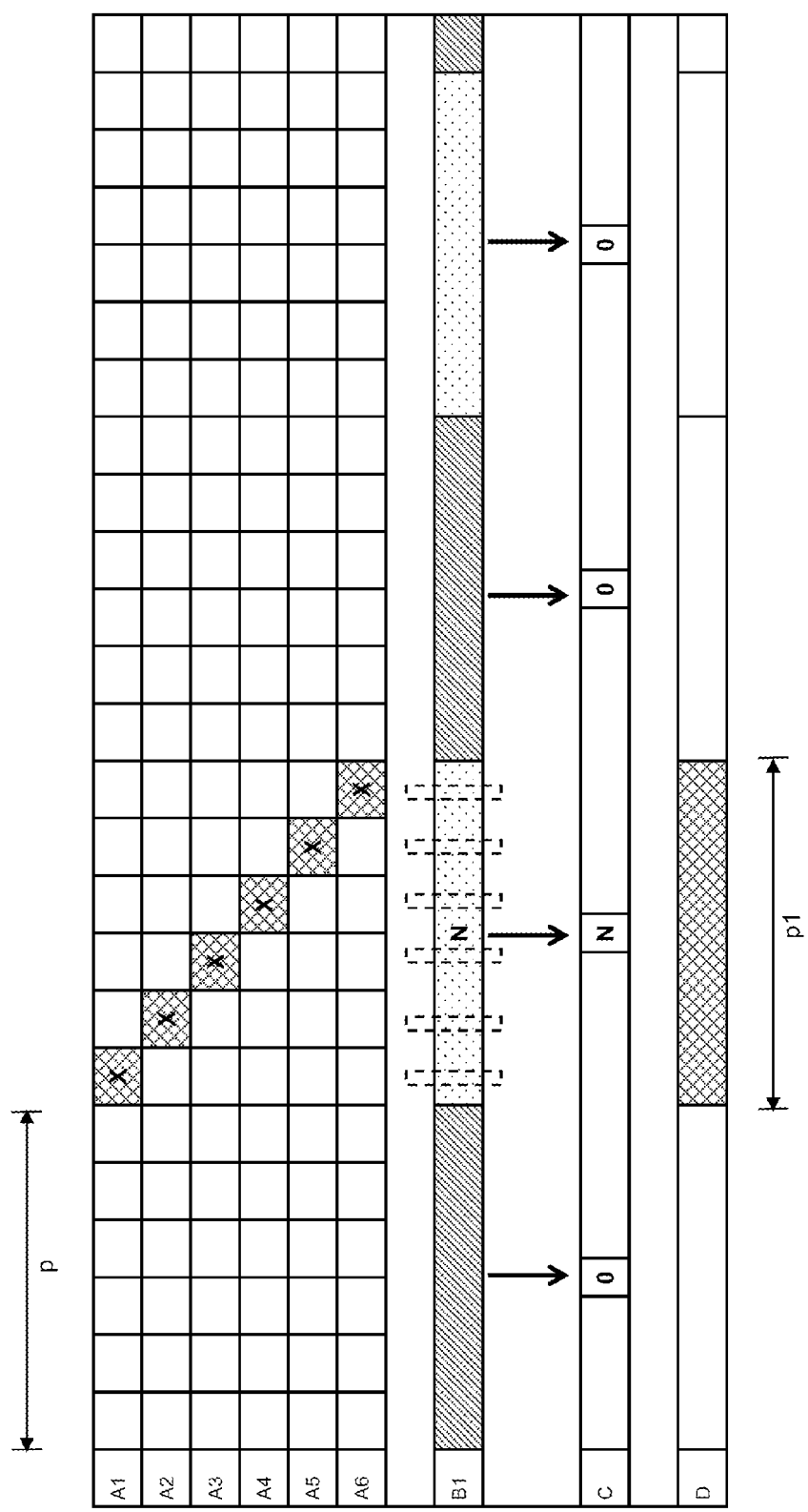

FIG. 9B shows in row B1 the detector elements of the group 903 which have the spacing p and which detect the X-ray fluorescence radiation emitted by the material piece 902. In this example, the material piece generates N X-ray photons per unit time. Each detector element is assigned, as illustrated in row C, a storage cell in which the number of registered X-ray photons is entered. In rows A1 to A6, the letter x denotes different possible positions of the material piece 902. For each of the positions A1 to A6, the detector element detects N counting events as illustrated. In this example, the achievable spatial resolution thus corresponds to the distance p1, which is equal to the distance p.

Figure 9C:
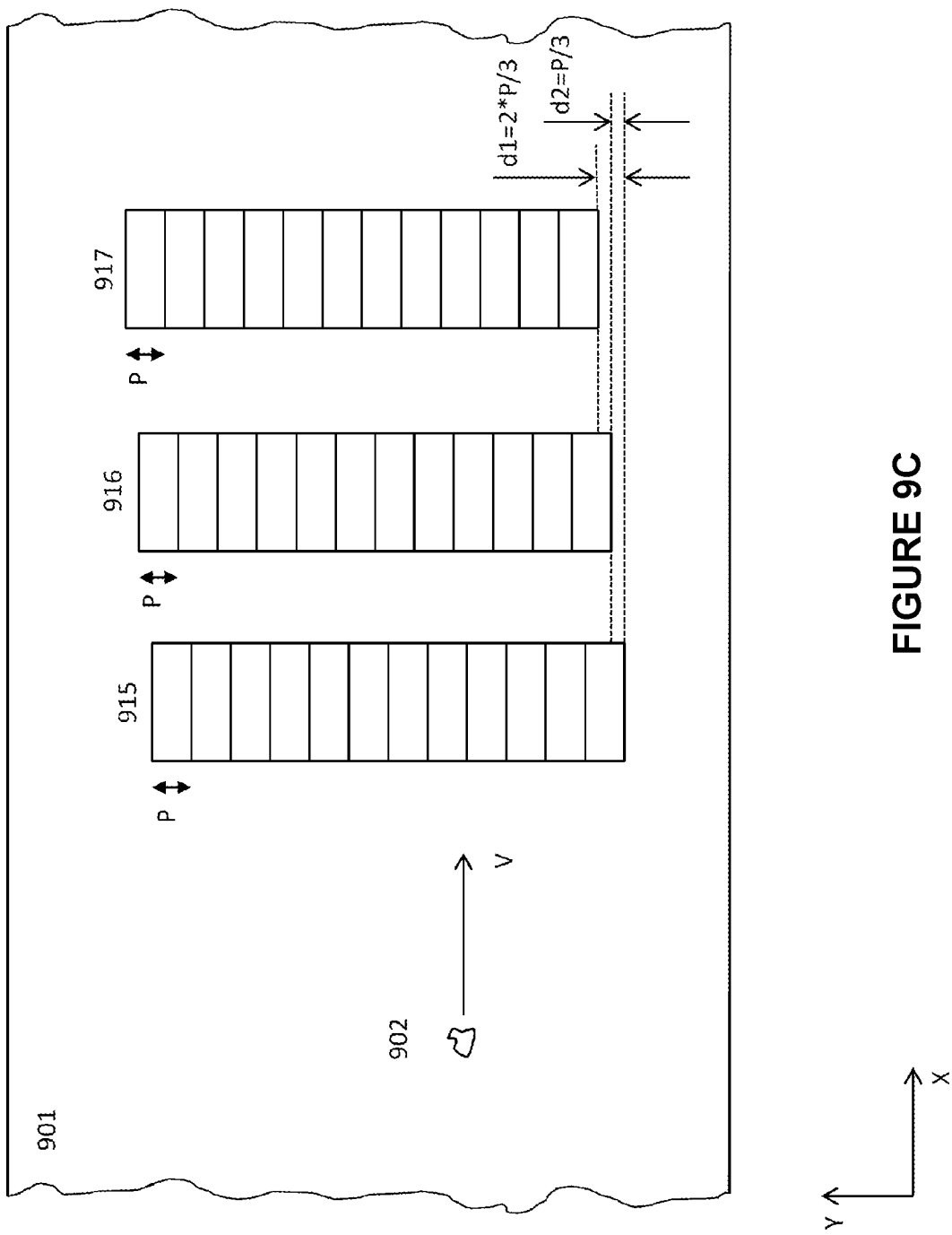

FIG. 9C shows by way of example a material piece 902 which moves toward three detector element groups 915, 916 and 917, which are parallel to one another, at the speed v. The spacing of the detector elements within each group amounts to the distance p. The detector elements of the groups 915, 916 and 917 are arranged offset by ⅓ p in each case.

Figure 9D:
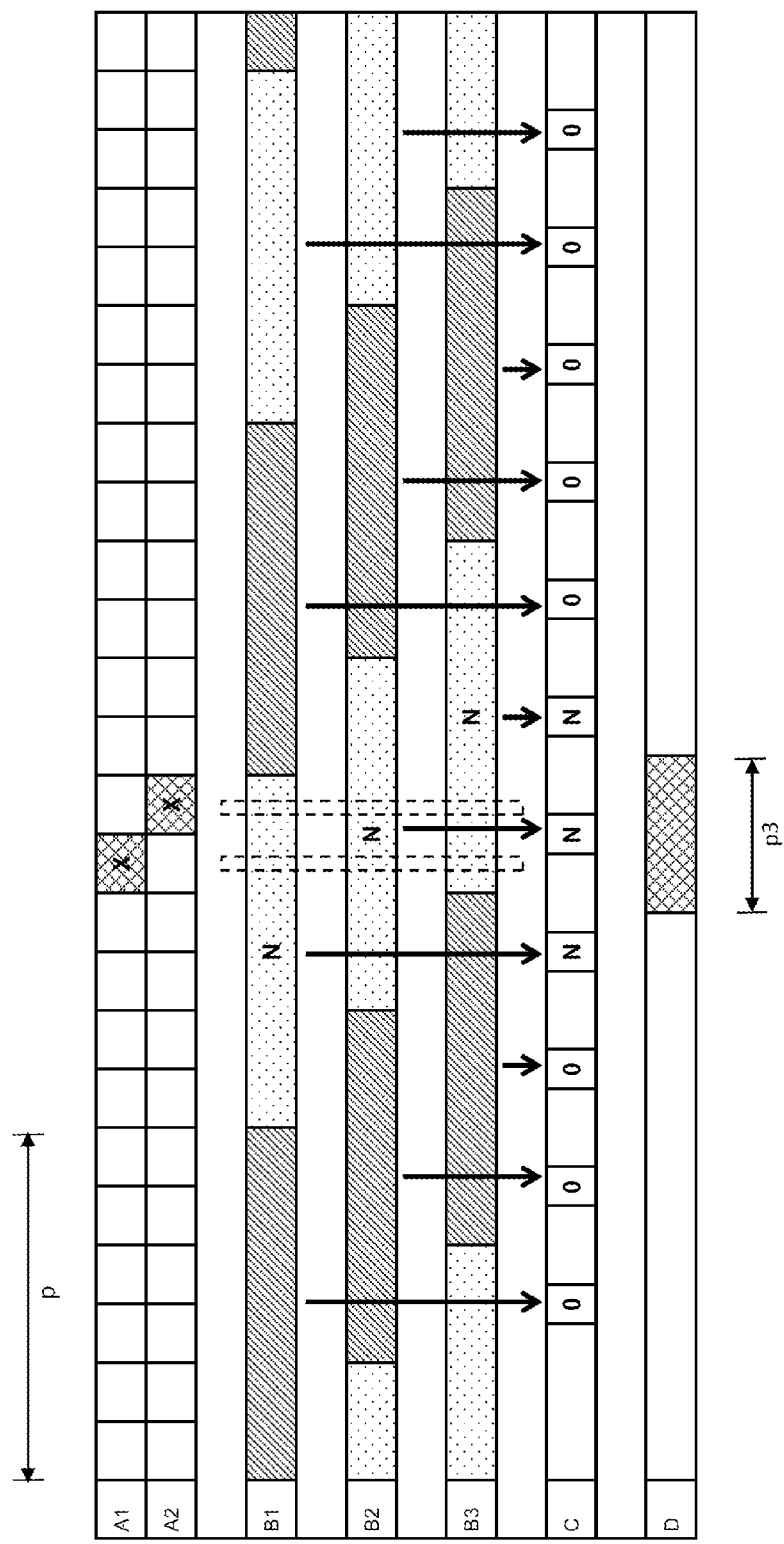

FIG. 9D shows in row B1 the detector elements of the group 915, in row B2 the detector elements of the group 916 and in row B3 the detector elements of the group 917. Each of the detector elements is assigned, as illustrated in row C, a storage cell in which the number of registered X-ray photons is entered. If the material piece 902 is situated at the positions A1 or A2, then in the three detector elements as illustrated in each case N counting events are registered and assigned to the corresponding storage cells. In this example, the spatial resolution achievable following application of suitable interpolation methods corresponds to the distance p3, which is significantly smaller than the distance p.

Figure 9E:
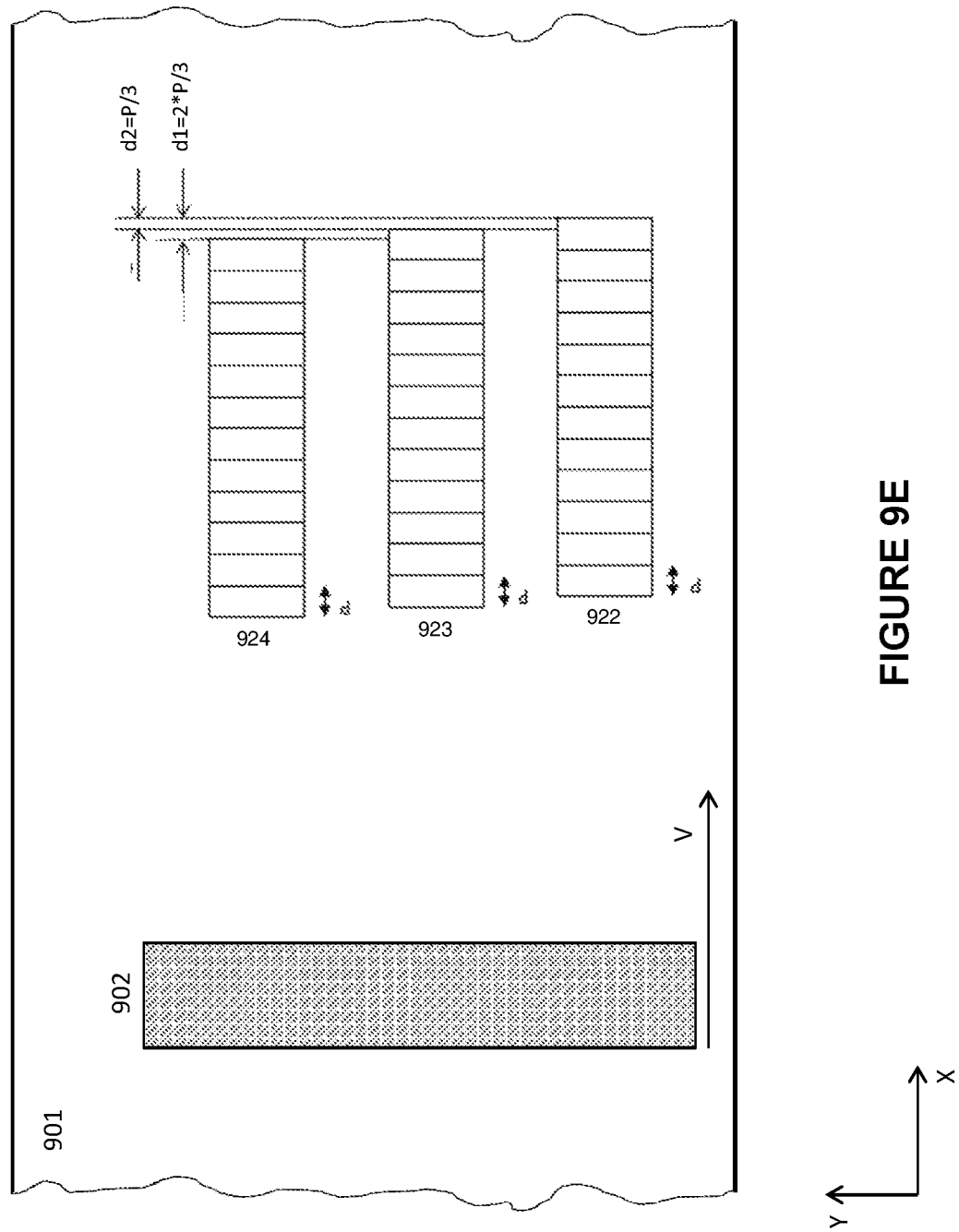

FIG. 9E shows that this functional principle can also be applied to the high-resolution spatial determination in the conveyor belt direction. The material piece 902 moves toward the groups 922, 923 and 924, which are arranged offset by the spacing p/3.

Figure 10A:
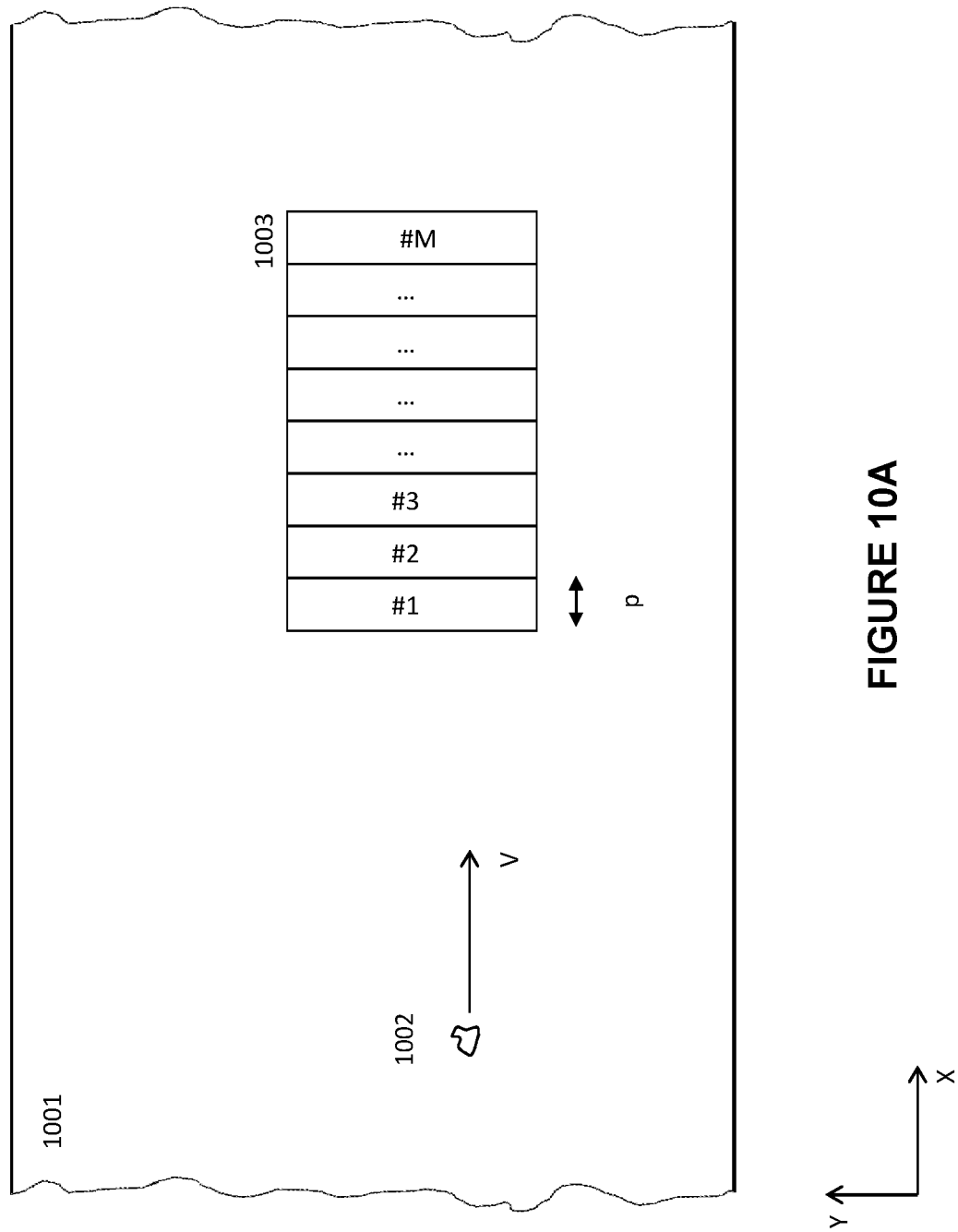
FIGS. 10A to 10C illustrate the functioning of one embodiment of the device which is characterized by the fact that individual groups of detector elements are operated in the TDI ("Time Delay Integration") mode synchronously with the instantaneous speed of the conveyor belt.
Figure 10B:
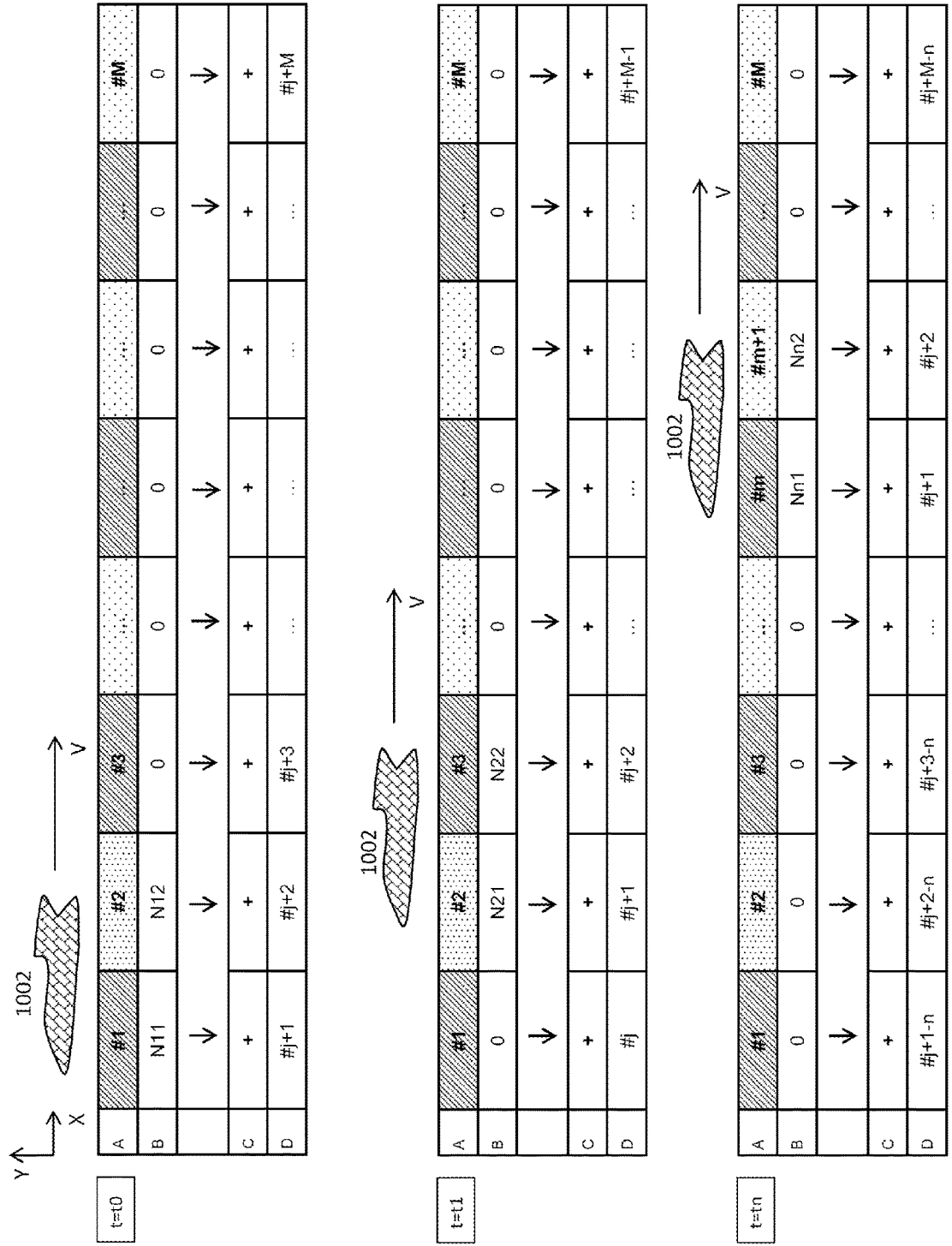
Figure 10C:
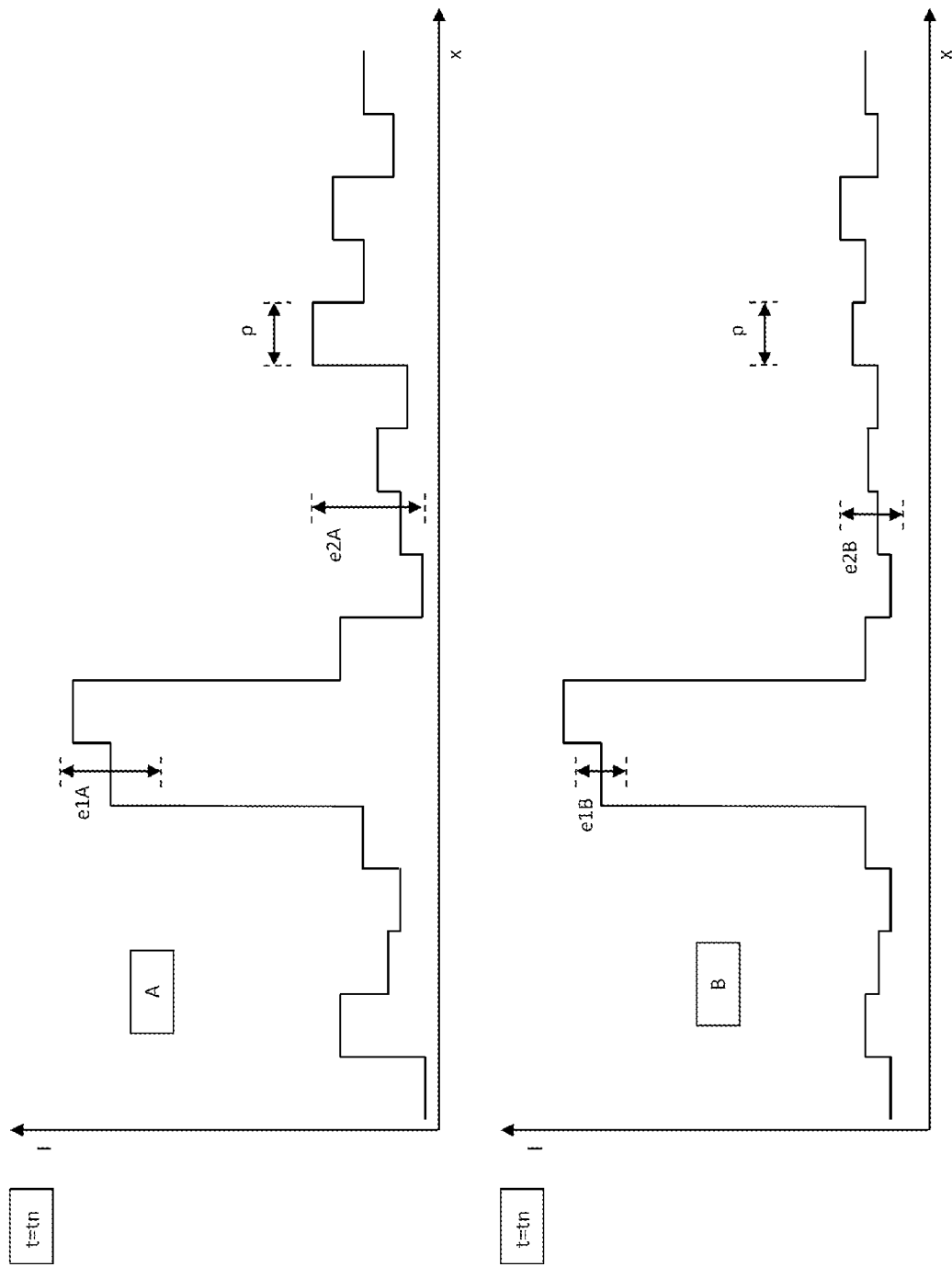

FIGS. 10A to 10C illustrate the functioning of one embodiment of the device which is characterized by the fact that individual groups of detector elements are operated in the TDI ("Time Delay Integration") mode synchronously with the instantaneous speed of the conveyor belt.

FIG. 10A shows by way of example a material piece 1002 which moves toward a detector element group 1003 at the speed v. The group consists of M detector elements. The spacing of the individual detector elements amounts to the distance p.

FIG. 10B illustrates by way of example the functioning of the TDI method. The illustration shows the spatial position of the material piece 1002 relative to the individual detector elements #1 to # M (row A) and at the points in time t0, t1 and tn. At the point in time t0, the detector element #1 registers the number of N11 X-ray photons, and the detector element #2 registers the number of N12 photons. N11 is added to the existing content of storage cell # j+1 (row D), and N12 to the content of storage cell # j+2. Exactly the same procedure is adopted at the subsequent points in time. The X-ray photons emitted by the material piece 1002 are in turn added to the storage cells # j+1 and # j+2. At the point in time t1, therefore, the counting rates N21 and N22 are added to the storage cells # j+1 and # j+2, and at the point in time tn, the counting rates Nn1 and Nn2 are added to the storage cells # j+1 and # j+2.

FIG. 10C shows by way of example an intensity profile plotted against the conveyor belt direction, which intensity profile was measured by the detector element group 1003. The measurement was carried out without the TDI method in case A and with application of the TDI method in case B. In case B, the intensity fluctuations e1B for the detected material piece 1002 and the intensity fluctuations for the measured background radiation e2B, on account of the TDI method, are significantly smaller than those in case A. The spatial position and the material composition of the material piece 1002 can thus be determined significantly better by applying the TDI method.

Figure 11A:
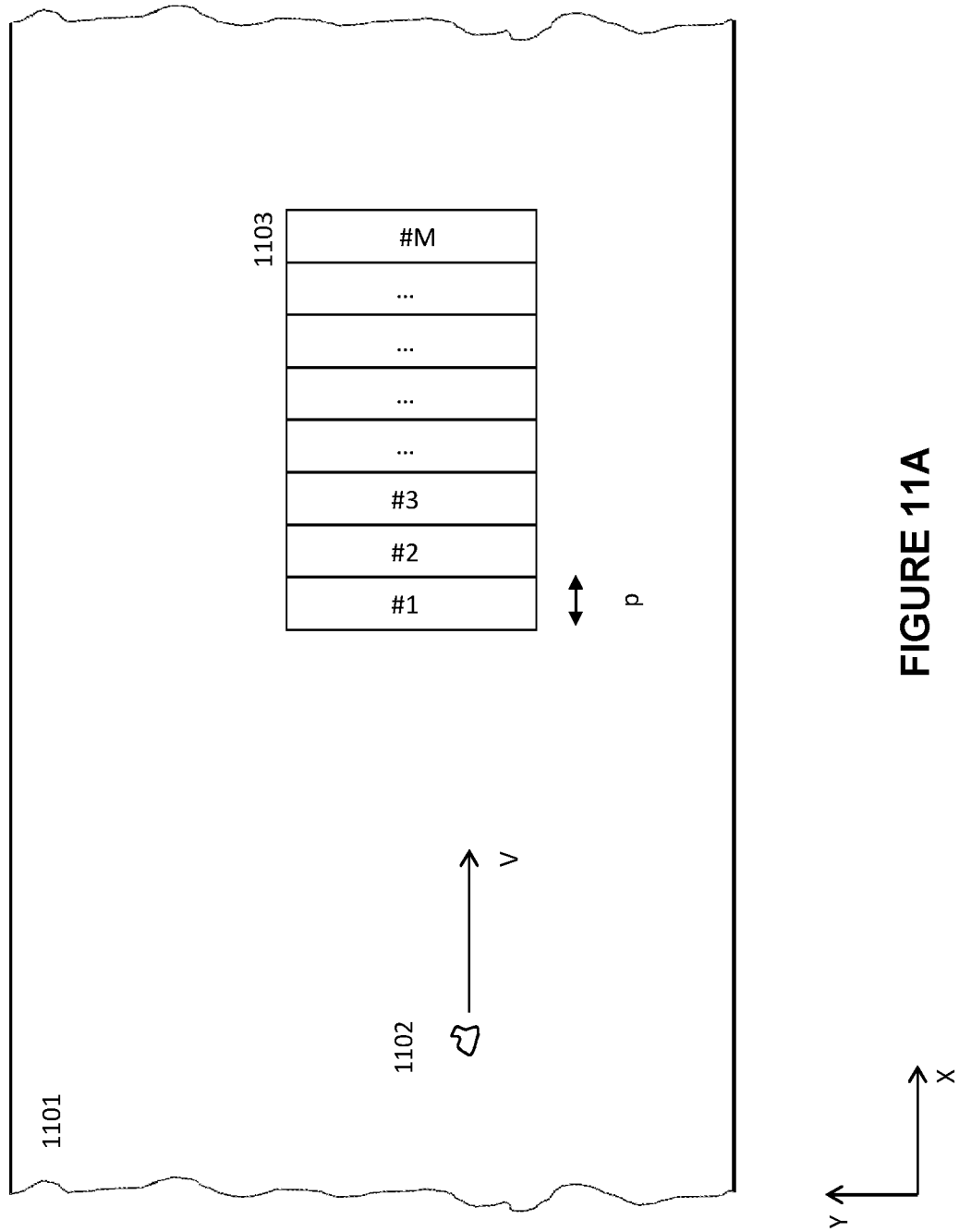
FIGS. 11A to 11C illustrate the functioning of one development which is characterized by the fact that the sub-channel method is applied to individual groups of detector elements, said method dividing the counting events of each individual physical detector element into at least two virtual signal channels.
Figure 11B:
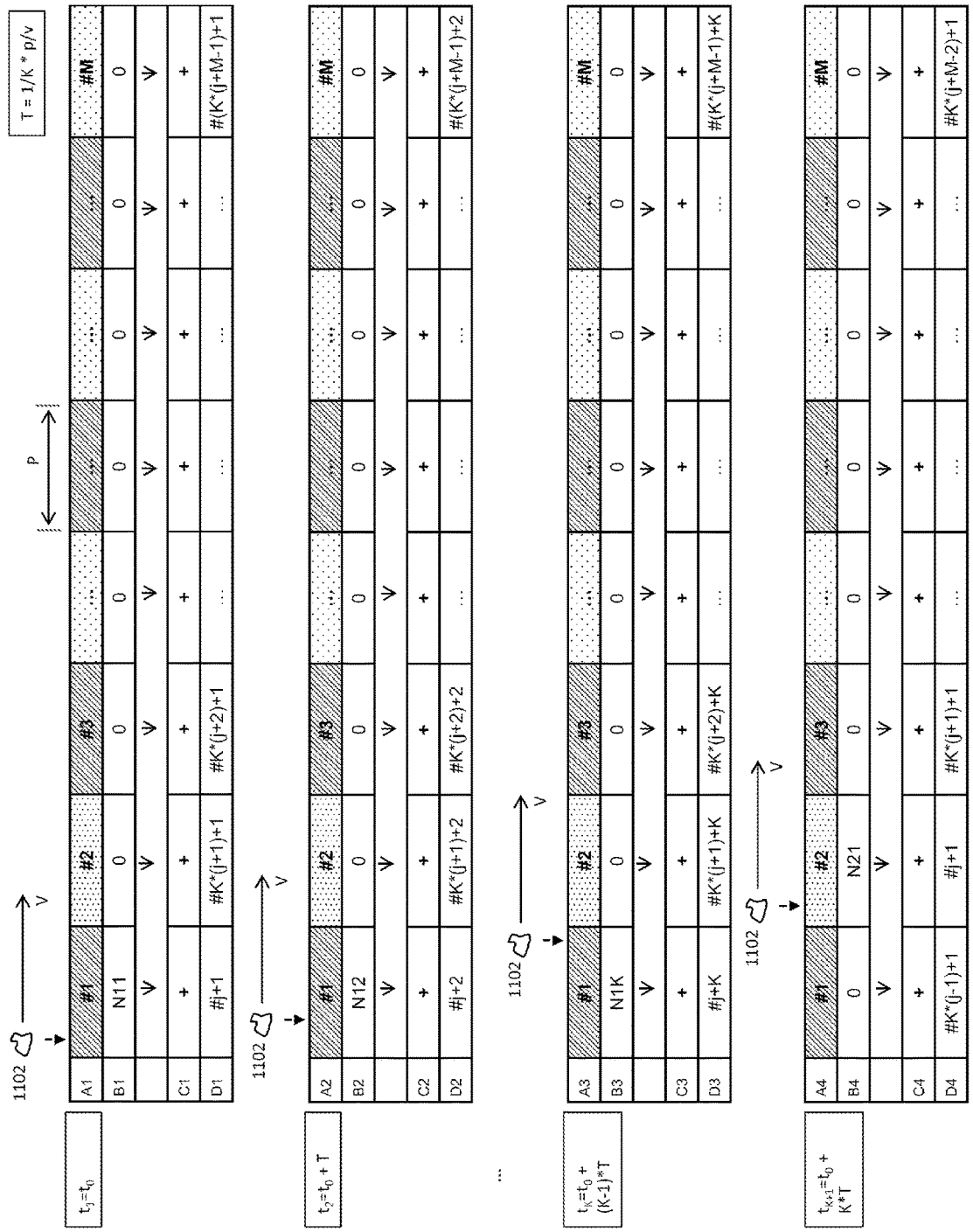
Figure 11C:
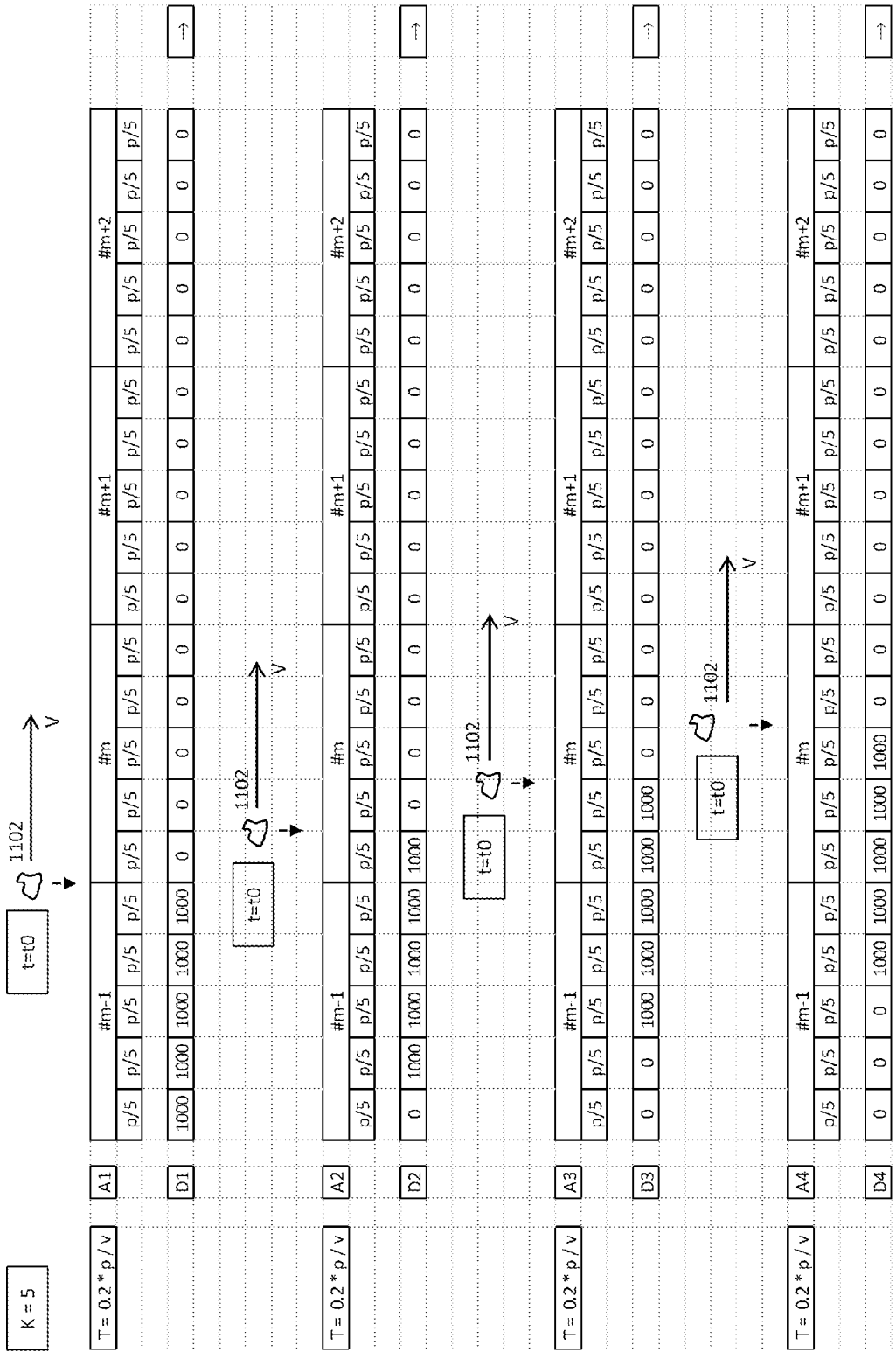

FIGS. 11A to 11C illustrate the functioning of one development which is characterized by the fact that the sub-channel method is applied to individual groups of detector elements, said method dividing the counting events of each individual physical detector element into at least two virtual signal channels. The method is carried out synchronously with the instantaneous speed of the conveyor belt and can be applied with or without the TDI method.

FIG. 11A shows by way of example a material piece 1102 which moves toward a detector element group 1103 at the speed v. The group consists of M detector elements. The spacing of the individual detector elements amounts to the distance p.

FIG. 11B illustrates by way of example the functioning of the sub-channel method with simultaneous application of the TDI method. The illustration shows the spatial position of the material piece 1102 relative to the individual detector elements #1 to # M (rows A1 to A4) and at the points in time $t_1$, $t_2$, $t_K$ and $t_{K+1}$. In this example, each real detector element is divided into K virtual detector elements having a virtual spacing of p/K. X-ray photons are in each case measured for a time duration T and allocated to the individual storage cells as follows. At the point in time to, the detector element #1 registers the number of N11 X-ray photons, and all other detector elements register the counting rate 0. N11 is added to the existing content of storage cell # j+1 (row D1). At the point in time $t_2$, the counting rate N12 is detected and counted toward the content of storage cell # j+2 (row D2). At the point in time $t_K$, the last sub-channel of detector element #1 is detected, the counting rate $N_{1K}$ is determined and allocated to storage cell # j+K (row D3). At the point in time $t_{K+1}$, the first sub-channel of detector element #2 is reached. The counting rate N21 is added to storage cell # j+1 (row D4).

FIG. 11C illustrates the mode of action of the sub-channel method for the case where the individual detector elements are divided for example into 5 virtual signal channels. The illustration shows in rows D1, D2, D3 and D4 the intensities summed in the storage cells for four different spatial positions A1, A2, A3 and A4 of the material piece 1102 that are assumed at the point in time $t_0$. The exposure duration corresponds to the time T. If the spatial position of the material piece 1102 differs in steps by the distance p/5 toward the right, as illustrated in cases A1, A2, A3 and A4, then in the data memory the measured intensities are likewise offset toward the right by one storage cell. With this method, therefore, it is possible to register changes in the X-ray photon intensity even actually within an individual detector element.

Figure 12:
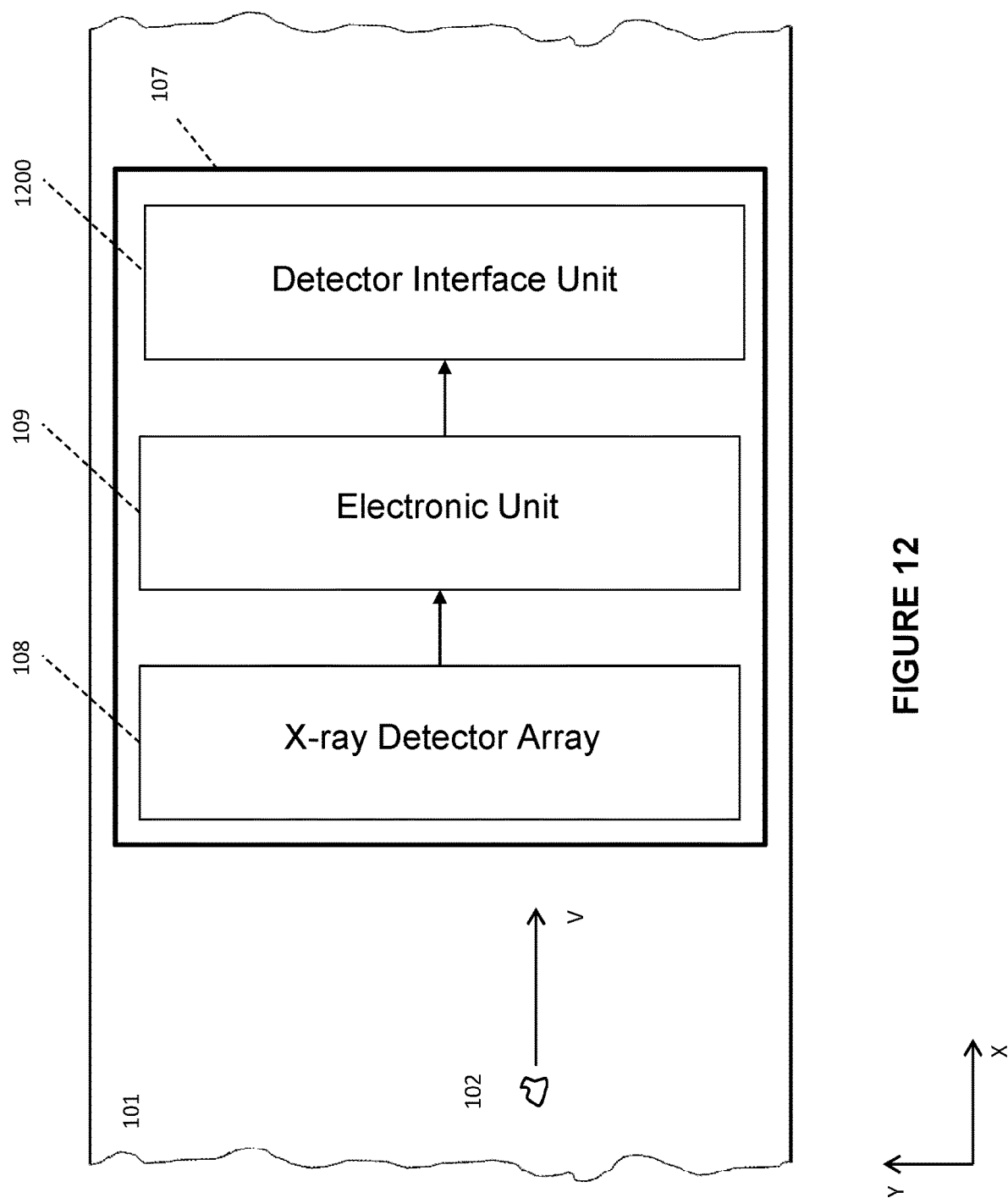
FIG. 12 shows one embodiment of the device which is characterized by the fact that the detector interface unit 1200 is preferably situated within the detector head 107.

FIG. 12 shows one embodiment of the device which is characterized by the fact that the detector interface unit 1200 is preferably situated within the detector head 107. In a customary manner, an FPGA ("Field-programmable gate array") or an ASIC ("Application-specific integrated circuit") or a freely programmable controller is used for reading out the digital signals from the counting units which are situated in the electronic unit 109.

Figure 13:
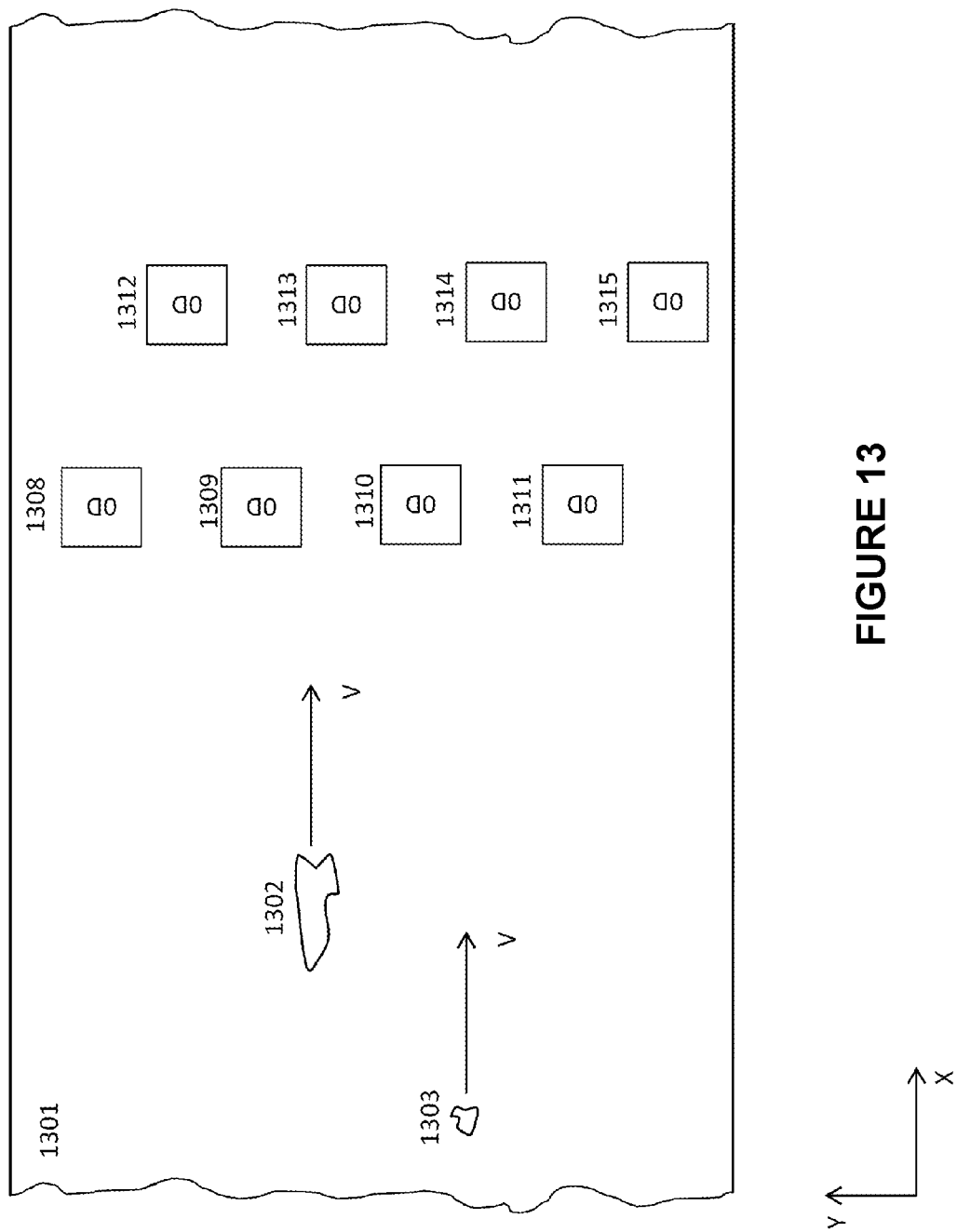
FIG. 13 shows one embodiment of the device according to the invention which is characterized by the fact that one or a plurality of groups of detector elements is (are) not operated as a spatially resolving 1D detector, but rather as a 0D detector arranged in a planar fashion.

FIG. 13 shows one embodiment of the device according to the invention which is characterized by the fact that one or a plurality of groups of detector elements is (are) not operated as a spatially resolving 1D detector, but rather as a 0D detector arranged in a planar fashion. In the example illustrated, the material pieces 1302 and 1303 are moved by the conveyor belt. The X-ray detector arrays 1308 to 1315 are operated in each case as a 0D detector. Within an X-ray detector array, for this purpose the counting events of the individual detector elements are added together and output as a single measurement value. If a plurality of energy windows were defined, such a measurement value is determined and output for each energy window.

Figure 14:
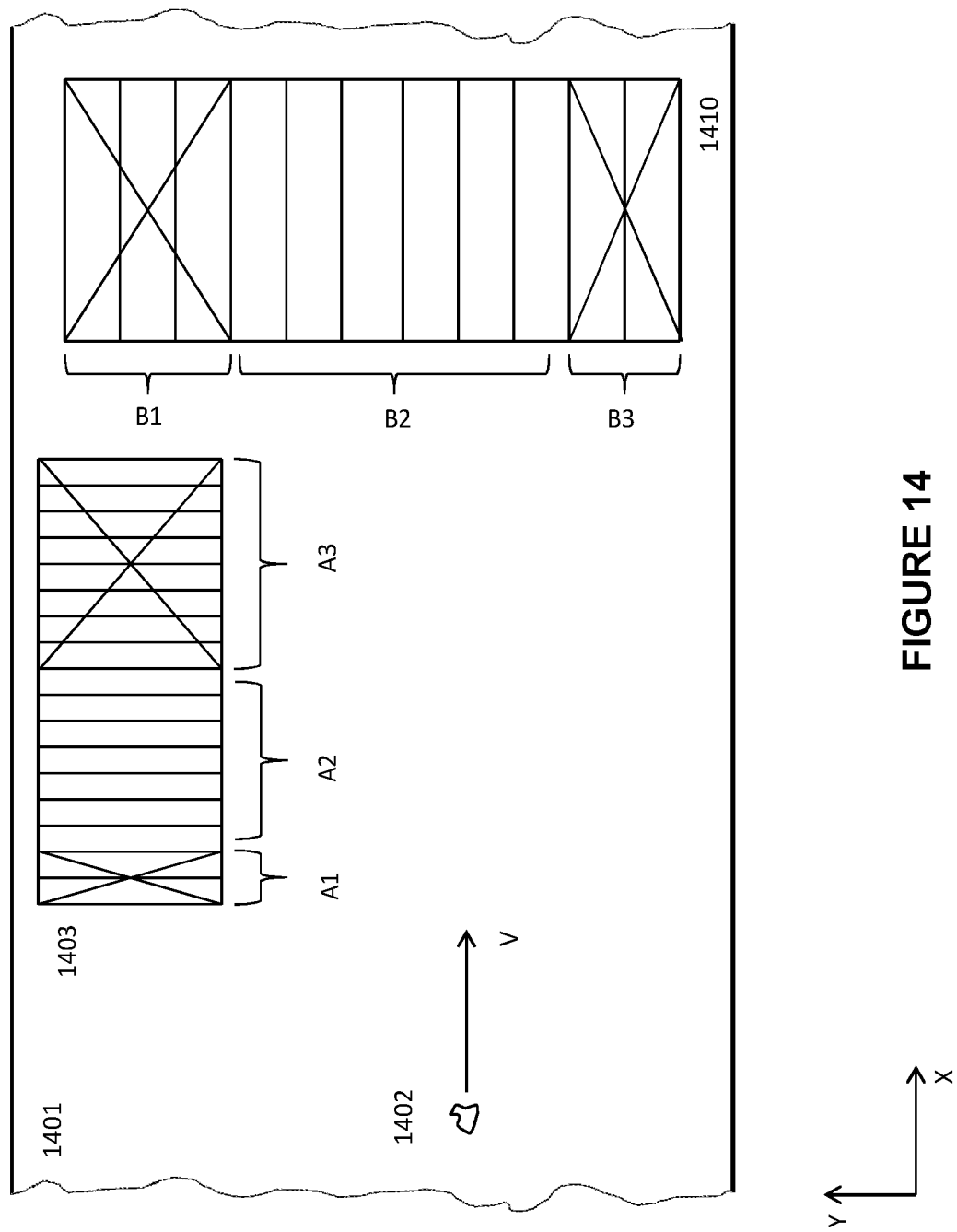
FIG. 14 shows one embodiment of the invention which is characterized by the fact that each individual detector element of a group of detector elements can be deactivated.

FIG. 14 shows one embodiment of the invention which is characterized by the fact that each individual detector element of a group of detector elements can be deactivated. By way of example, in the groups 1403 and 1410 the detector elements in the regions A1, A3, B1 and B3 were deactivated. The active area thus comprises only the regions A2 and B2.

The invention claimed is:

1. A device for identifying materials on a moving conveyor belt by means of X-ray fluorescence comprising:
an X-ray source from which X-ray radiation is guided onto said materials;
a detector head having a plurality of detector elements each of which receives an X-ray signal scattered or fluoresced by said materials and converts said X-ray signal to a respective analog electrical signal, said respective analog electrical signals each corresponding to a plurality of different predetermined X-ray energy ranges that encompass, respectively, a plurality of different characteristic energies each indicative of a different material to be identified; and
a plurality of electronic sub-units each of which receives a respective one of the analog electrical signals and each of which comprises:
a discriminator that applies a plurality of energy thresholds to its respective analog energy signal to limit it to one or more of said predetermined energy ranges; and
a counting unit apparatus that quantizes each portion of the analog electrical signal that falls within one of said predetermined energy ranges;
wherein each sub-unit is connected to corresponding sub-units of detector elements that are spatially directly adjacent thereto to allow identification of charge-sharing events caused by a simultaneous detection of an X-ray signal on adjacent detector elements, and a corresponding compensation therefor by the sub-units associated with said adjacent detector elements.

2. The device as claimed in claim 1, wherein the detector elements are arranged in a planar, strip-shaped fashion in at least one group within which the individual elements are aligned parallel to one another.

3. The device as claimed in claim 2, wherein first groups of detector elements are arranged orthogonally with respect to the conveyor belt direction and individual detector elements of said first groups are arranged parallel to the conveyor belt direction and/or second groups of detector elements are arranged parallel to the conveyor belt direction and individual detector elements of said second groups are arranged orthogonally with respect to the conveyor belt direction.

4. The device as claimed in claim 3, wherein the X-ray detector is constructed from a combination of said first and said second groups of detector elements.

5. The device as claimed in claim 1, wherein at least some of the detector elements are constructed from a silicon strip sensor having a substrate with a thickness of more than 300 µm.

6. The device as claimed in claim 1, wherein the discriminator of each electronic sub-unit limits its respective analog signal to a plurality of said different predetermined energy ranges, and the counting unit apparatus individually quantizes each of the portions of said respective analog signal encompassed by a different one of said predetermined energy ranges.

7. The device as claimed in claim 1, wherein the connection of one of said sub-units to a corresponding sub-unit of a detector element that is spatially directly adjacent thereto comprises an elimination unit with a parameterizable VETO discriminator threshold, and wherein the elimination unit prevents counting of X-ray photons arriving at the adjacent sub-units when said VETO threshold is exceeded by the analog electrical signals of the two adjacent sub-units.

8. The device as claimed in claim 1, wherein the connection of one of said sub-units to a corresponding sub-unit of a detector element that is spatially directly adjacent thereto comprises a correction unit that identifies simultaneously occurring Gaussian curve-like analog electrical signals in adjacent electronic sub-units and, in such a case, forms the sum of the amplitudes of the Gaussian curve-like analog electrical signals, and allocates a resulting summation signal to that sub-unit whose Gaussian curve-like analog electrical signal has the highest signal amplitude, and suppresses registration of a corresponding signal detected in the other sub-unit.

9. The device as claimed in claim 1, wherein the X-ray detector is constructed from n>2 first groups having in each case an identical strip spacing, wherein the strips are arranged offset from one group to the next group by the distance of the strip spacing divided by n.

10. The device as claimed in claim 1, wherein individual groups of detector elements in a TDI ("Time Delay Integration") mode are operated synchronously with the instantaneous speed of the conveyor belt.

11. The device as claimed in claim 10, wherein a sub-channel method is applied to the individual groups of detector elements, said method dividing the counting events of the electronic sub-units corresponding to each individual physical detector element into more than two virtual signal channels.

12. The device as claimed in claim 1 further comprising, for reading out digital signals from the counting unit apparatuses, an FPGA ("Field-programmable gate array"), an ASIC ("Application-specific integrated circuit") or a freely programmable controller.

13. The device as claimed in claim 1, wherein a group of the detector elements is arranged in a planar fashion and operated as a 0D detector, and counting events resulting from the signals received by all the individual detector elements of said group are added together and output as a single measurement value.

14. The device as claimed in claim 1, wherein each individual detector element is deactivatable.

15. The device as claimed in claim 1, wherein the X-ray detector is configured such that the X-ray detector can carry out continuously at least 2000 individual measurements per second.

16. The device as claimed in claim 1, wherein the detector elements are organized into a plurality of detection groups, each of which is dedicated to the detection of a different one of said predetermined energy ranges.

17. An apparatus according to claim 16 wherein the discriminator of each electronic sub-unit limits its respective analog electrical signal to the one of said predetermined energy ranges that corresponds to the detection group of the detection element associated with said respective analog electrical signal.

18. The device as claimed in claim 1, wherein the detector elements each have a spatial resolution of 50 µm to 500 µm.

19. The device as claimed in claim 1, wherein the detector elements each have a sensitivity to X-ray radiation in an energy range of between 500 eV and 30 keV.

20. The device as claimed in claim 1, wherein the detector elements each have an energy resolution of less than 0.5 keV at counting rates of up to 100 kcps relative to an energy of 8.04 keV.

* * * * *